(12) United States Patent
Buccola, Jr. et al.

(10) Patent No.: US 11,585,152 B2
(45) Date of Patent: *Feb. 21, 2023

(54) MOTOR ASSEMBLY FOR AN ARCHITECTURAL COVERING

(71) Applicant: Hunter Douglas Inc., Pearl River, NY (US)

(72) Inventors: Nickolas C. Buccola, Jr., Brighton, CO (US); Kenneth M. Faller, Thornton, CO (US)

(73) Assignee: Hunter Douglas Inc., Pearl River, NY (US)

( * ) Notice: Subject to any disclaimer, the term of this patent is extended or adjusted under 35 U.S.C. 154(b) by 195 days.

This patent is subject to a terminal disclaimer.

(21) Appl. No.: 16/894,148

(22) Filed: Jun. 5, 2020

(65) Prior Publication Data

US 2020/0399959 A1 Dec. 24, 2020

Related U.S. Application Data

(63) Continuation of application No. 15/425,824, filed on Feb. 6, 2017, now Pat. No. 10,676,989.
(Continued)

(51) Int. Cl.
*E06B 9/72* (2006.01)
*E06B 9/34* (2006.01)
(Continued)

(52) U.S. Cl.
CPC ............ *E06B 9/72* (2013.01); *E06B 9/34* (2013.01); *E06B 9/44* (2013.01); *H02K 7/003* (2013.01); *E06B 2009/6809* (2013.01)

(58) Field of Classification Search
CPC ...... E06B 9/72; E06B 9/50; E06B 9/68; E06B 9/34; E06B 9/40; E06B 9/322; E06B 9/32; E06B 9/174
See application file for complete search history.

(56) References Cited

U.S. PATENT DOCUMENTS

| 3,411,254 A | 11/1968 | Kessler |
| 4,538,785 A | 9/1985 | Damsgaard |

(Continued)

FOREIGN PATENT DOCUMENTS

| EP | 3219899 | 9/2017 |
| WO | 03080978 | 10/2003 |

(Continued)

OTHER PUBLICATIONS

United States Patent and Trademark Office, "Notice of Allowance," mailed in connection with U.S. Appl. No. 15/425,824, dated Jan. 23, 2020, 9 pages.

(Continued)

*Primary Examiner* — Johnnie A. Shablack
(74) *Attorney, Agent, or Firm* — Kilpatrick Townsend & Stockton LLP

(57) ABSTRACT

An architectural covering including a motor assembly is provided. The covering may include a head rail, an end cap enclosing an end of the head rail, a roller tube rotatably supported within the head rail at least partially by the end cap, and a motor assembly including a housing in splined engagement with the end cap to non-rotatably secure the motor assembly to the end cap. The motor assembly may be received at least partially within the roller tube and may be in driving engagement with the roller tube. A covering material may be attached to the roller tube such that rotation of the roller tube extends or retracts the covering material.

20 Claims, 11 Drawing Sheets

Related U.S. Application Data

(60) Provisional application No. 62/297,764, filed on Feb. 19, 2016.

(51) Int. Cl.
    *E06B 9/44*         (2006.01)
    *H02K 7/00*        (2006.01)
    *E06B 9/68*        (2006.01)

(56) References Cited

U.S. PATENT DOCUMENTS

| | | |
|---|---|---|
| 5,029,629 A | 7/1991 | Cheng-Pei |
| 5,105,871 A | 4/1992 | Baud et al. |
| 5,586,631 A | 12/1996 | Benthin |
| 5,857,553 A | 1/1999 | Lagarde et al. |
| 6,244,325 B1 | 6/2001 | Miller et al. |
| 6,289,964 B1 | 9/2001 | Colson et al. |
| 6,700,246 B1 | 3/2004 | Bruhn |
| 6,873,461 B1 | 3/2005 | McPherson, Jr. |
| 6,935,401 B2 | 8/2005 | Fraczek et al. |
| 7,057,360 B1 | 6/2006 | Hsu |
| 7,195,052 B2 | 3/2007 | Nien et al. |
| 7,407,040 B2 | 8/2008 | Doran |
| 7,464,742 B2 | 12/2008 | Oskam et al. |
| 7,677,294 B2 | 3/2010 | Bohlen |
| 7,740,047 B2 | 6/2010 | Koop et al. |
| 7,839,035 B2 | 11/2010 | Hwaung |
| 7,995,274 B1 | 8/2011 | Cheou et al. |
| 8,122,932 B2 | 2/2012 | Cannaverde |
| 8,136,569 B2 | 3/2012 | Bohlen et al. |
| 8,151,859 B2 | 4/2012 | Koop et al. |
| 8,299,734 B2 | 10/2012 | Mullet et al. |
| 8,307,878 B2 | 11/2012 | Faller et al. |
| 8,368,328 B2 | 2/2013 | Mullet et al. |
| 8,371,358 B1 | 2/2013 | Mullet et al. |
| 8,382,050 B2 | 2/2013 | Koop |
| 8,408,486 B2 | 4/2013 | Di Stefano |
| 8,464,776 B2 | 6/2013 | Anthoine |
| 8,513,845 B2 | 8/2013 | Angelini |
| 8,575,872 B2 | 11/2013 | Mullet et al. |
| 8,579,004 B2 | 11/2013 | Cannaverde |
| 8,597,157 B2 | 12/2013 | Pezet |
| 8,608,126 B2 | 12/2013 | Ng et al. |
| 8,659,246 B2 | 2/2014 | Mullet et al. |
| 8,695,681 B2 | 4/2014 | Daniels |
| 8,708,877 B2 | 4/2014 | Kirihara et al. |
| 8,714,500 B2 | 5/2014 | Ng et al. |
| 8,723,454 B2 | 5/2014 | Skinner et al. |
| 8,791,658 B2 | 7/2014 | Mullet et al. |
| 8,806,806 B2 | 8/2014 | Leivenzon et al. |
| 8,839,841 B2 | 9/2014 | Koop et al. |
| 8,919,419 B2 | 12/2014 | Mullet et al. |
| 8,947,027 B2 | 2/2015 | Mullet et al. |
| 8,960,256 B2 | 2/2015 | Wagner et al. |
| 9,018,868 B2 | 4/2015 | Lucas et al. |
| 9,057,408 B2 | 6/2015 | Dupielet et al. |
| 9,080,381 B2 | 7/2015 | Haarer et al. |
| 9,152,032 B2 | 10/2015 | Mullet et al. |
| 9,175,514 B2 | 11/2015 | Ducornetz et al. |
| 9,194,179 B2 | 11/2015 | Mullet et al. |
| 9,238,939 B2 | 1/2016 | Di Stefano |
| 9,249,623 B2 | 2/2016 | Mullet et al. |
| 9,303,707 B2 | 4/2016 | Fraczek |
| 9,347,261 B2 | 5/2016 | Blair et al. |
| 9,376,862 B2 | 6/2016 | Mullet et al. |
| 9,376,863 B2 | 6/2016 | Mullet et al. |
| 9,394,743 B2 | 7/2016 | Mullet et al. |
| 9,410,369 B2 | 8/2016 | Mullet et al. |
| 9,410,371 B2 | 8/2016 | Faller et al. |
| 9,593,530 B1 | 3/2017 | Anthony et al. |
| 9,598,901 B2 | 3/2017 | Kirby et al. |
| 9,611,690 B2 | 4/2017 | Mullet et al. |
| 9,617,787 B2 | 4/2017 | Bohlen |
| 9,722,220 B2 | 8/2017 | Lemaitre et al. |
| 9,725,948 B2 | 8/2017 | Mullet et al. |
| 9,725,952 B2 | 8/2017 | Mullet et al. |
| 9,745,797 B2 | 8/2017 | Mullet et al. |
| 9,765,568 B2 | 9/2017 | Colson et al. |
| 9,771,755 B2 | 9/2017 | Mullet et al. |
| 9,834,986 B2 | 12/2017 | Bohlen et al. |
| 9,890,585 B2 | 2/2018 | Mullet et al. |
| 9,890,587 B2 | 2/2018 | Adams et al. |
| 9,896,882 B2 | 2/2018 | Mullet et al. |
| 9,926,741 B2 | 3/2018 | Faller et al. |
| 9,951,556 B2 | 4/2018 | Newman, Jr. |
| 10,017,986 B2 | 7/2018 | Brondex |
| 10,036,200 B2 | 7/2018 | Anderson et al. |
| 10,138,676 B2 | 11/2018 | Bohlen et al. |
| 10,180,029 B2 | 1/2019 | Adreon et al. |
| 10,246,938 B2 | 4/2019 | Mullet et al. |
| 10,253,556 B2 | 4/2019 | Downey |
| 10,273,751 B2 | 4/2019 | Colson et al. |
| 10,309,153 B2 | 6/2019 | McPherson et al. |
| 10,337,241 B2 | 7/2019 | Adreon et al. |
| 10,344,532 B2 | 7/2019 | Mazzoni |
| 10,428,580 B2 * | 10/2019 | Vries .................. E06B 9/50 |
| 10,676,989 B2 | 6/2020 | Buccola, Jr. et al. |
| 10,938,268 B2 * | 3/2021 | Meynet ............... H02K 7/116 |
| 2003/0051830 A1 | 3/2003 | Garcia Garcia |
| 2005/0035238 A1 | 2/2005 | Fun |
| 2005/0225269 A1 | 10/2005 | Barak |
| 2006/0232234 A1 | 10/2006 | Newman, Jr. |
| 2008/0121353 A1 | 5/2008 | Detmer et al. |
| 2009/0056885 A1 | 3/2009 | Garmyn et al. |
| 2009/0242145 A1 | 10/2009 | Sheu |
| 2010/0175838 A1 | 7/2010 | Faller et al. |
| 2010/0200176 A1 | 8/2010 | Magli |
| 2011/0139381 A1 | 6/2011 | Daniels |
| 2011/0139382 A1 | 6/2011 | Daniels |
| 2013/0092333 A1 | 4/2013 | Malausa et al. |
| 2013/0199735 A1 | 8/2013 | Colson et al. |
| 2015/0007949 A1 | 1/2015 | Daniels |
| 2015/0034258 A1 | 2/2015 | Bohlen et al. |
| 2015/0047795 A1 | 2/2015 | Bohlen et al. |
| 2015/0101766 A1 | 4/2015 | Feldstein et al. |
| 2015/0136338 A1 | 5/2015 | Lemaitre et al. |
| 2015/0191973 A1 | 7/2015 | Bohlen |
| 2015/0300088 A1 | 10/2015 | Lemaitre et al. |
| 2016/0130866 A1 | 5/2016 | Buccola, Jr. et al. |
| 2016/0153230 A1 | 6/2016 | Greening |
| 2016/0369558 A1 | 12/2016 | Kirby |
| 2017/0006740 A1 | 1/2017 | Holt et al. |
| 2017/0130528 A1 | 5/2017 | Anthony et al. |
| 2017/0183909 A1 | 6/2017 | Kirby et al. |
| 2017/0204661 A1 | 7/2017 | Dann et al. |
| 2017/0241201 A1 * | 8/2017 | Buccola, Jr. .............. E06B 9/44 |
| 2018/0023340 A1 | 1/2018 | Goldberg et al. |
| 2018/0106105 A1 | 4/2018 | Anthony et al. |
| 2018/0171710 A1 | 6/2018 | Kirby |
| 2018/0202226 A1 | 7/2018 | Georgeault et al. |
| 2018/0202228 A1 | 7/2018 | Faller et al. |
| 2018/0259033 A1 | 9/2018 | Basutto |
| 2018/0283096 A1 | 10/2018 | Nelson |
| 2018/0313144 A1 | 11/2018 | Anderson et al. |
| 2018/0335095 A1 | 11/2018 | Hall et al. |
| 2019/0024452 A1 | 1/2019 | Derk, Jr. et al. |
| 2019/0032404 A1 | 1/2019 | Chacon et al. |
| 2019/0085624 A1 | 3/2019 | Kirby et al. |
| 2019/0085632 A1 | 3/2019 | Smith et al. |
| 2019/0145163 A1 | 5/2019 | Thomsen |

FOREIGN PATENT DOCUMENTS

| | | |
|---|---|---|
| WO | 2006045724 | 5/2006 |
| WO | 2007091752 | 8/2007 |
| WO | 2008025494 | 3/2008 |
| WO | 2009030474 | 3/2009 |
| WO | 2009086898 | 7/2009 |
| WO | 2009100504 | 8/2009 |
| WO | 2010048118 | 4/2010 |
| WO | 2011106397 | 9/2011 |
| WO | 2011106398 | 9/2011 |
| WO | 2011150071 | 12/2011 |
| WO | 2013059037 | 4/2013 |

(56) References Cited

FOREIGN PATENT DOCUMENTS

| | | |
|---|---|---|
| WO | 2014062504 | 4/2014 |
| WO | 2014169173 | 10/2014 |
| WO | 2017140894 | 8/2017 |

OTHER PUBLICATIONS

United States Patent and Trademark Office, "Non-final Office Action," mailed in connection with U.S. Appl. No. 15/425,824, dated Aug. 1, 2019, 21 pages.

United States Patent and Trademark Office, "Requirement for Restriction/Election," mailed in connection with U.S. Appl. No. 15/425,824, dated Feb. 11, 2019, 8 pages.

* cited by examiner

MOTOR ASSEMBLY FOR AN ARCHITECTURAL COVERING

RELATED APPLICATIONS

This patent is a continuation of U.S. application Ser. No. 15/425,824 (now U.S. Pat. No. 10,676,989), titled "Motor Assembly for an Architectural Covering," filed Feb. 6, 2017, which claims the benefit of priority under 35 USC § 119(e) to U.S. Provisional Patent Application No. 62/297,764, titled "Motor Assembly for an Architectural Covering," filed Feb. 19, 2016, both of which are hereby incorporated by this reference in their entireties.

FIELD

The present disclosure relates generally to architectural coverings, and more particularly to a motor assembly for an architectural covering.

BACKGROUND

Architectural coverings, such as coverings for architectural structures or features, including walls and openings, such as windows, doorways, archways, or other architectural structure/feature, have taken numerous forms for many years. Many coverings include a motor assembly for moving a retractable shade (such as a sheet of material) between an extended position and a retracted position. The motor assembly typically is attached at one end to a stationary structure (such as an end cap) and includes a drive structure at an opposite end for rotating a roller tube. During use, the motor assembly typically generates a torque about its longitudinal axis for rotating the roller tube and moving the retractable shade between the extended and retracted positions. If the connection of the motor assembly to the stationary structure is not sufficient to withstand the torque load, then the motor assembly may detach from the stationary structure during use, which may disconnect the motor assembly from its power source, damage electrical components associated with the motor assembly, and/or cause other damage to the covering. If the connection of the drive structure to a drive shaft of the motor assembly is not sufficient to withstand the torque load, then the drive structure may slip relative to the drive shaft, reducing the accuracy and/or efficiency of the motor assembly.

The motor assembly generally includes electrical components for operation of the motor assembly. During use, the covering may cause the generation of static electricity. For example, during extension and/or retraction of the retractable shade into and out of a head rail, static electricity may be generated. Static electricity also may be transmitted to the covering through a user's fingers after the user walks across the floor and touches the covering, such as to actuate a switch for the motor assembly. The static electricity may be harmful to the electrical components of the motor assembly if the static electricity discharges through sensitive electrical components (such as a printed circuit board).

The motor assembly typically is positioned at one end of a head rail of the covering. Generally, some components of the motor assembly (such as the electrical components) are positioned external to the roller tube due to size constraints within the roller tube. Some motor assemblies position these components along an inner surface of the stationary structure, thereby limiting the width dimension of the retractable shade and resulting in a light gap along the edges of the covering.

SUMMARY

The present disclosure is at least partially directed to a motor assembly that alleviates at least to a certain extent one or more of the aforementioned problems, addresses at least to a certain extent difficulties of prior motor assemblies, and/or generally provides a user with different motor assembly options.

The present disclosure generally provides a motor assembly used to raise and lower a covering for an architectural structure/feature, such as a roller-type covering for a window opening. The motor assembly may be coupled, such as attached, to a stationary structure of the covering, such as an end cap, in a manner that resists torsion loads so that the motor assembly remains coupled (e.g., attached) to the stationary structure during operation of the motor assembly. The motor assembly may securely connect a drive structure to a drive shaft of the motor assembly for improved accuracy and/or efficiency of the motor assembly. The motor assembly may be configured to insulate electrical components of the motor assembly from potential electrostatic discharge to reduce the likelihood of damage to the electrical components. The motor assembly may be fully-contained in a compact arrangement to permit the use of wider shades within an architectural structure/feature, thereby reducing light leakage around the edges of a deployed shade relative to existing motor-driven coverings.

The present disclosure is given to aid understanding, and one of skill in the art will understand that each of the various aspects and features of the disclosure may advantageously be used separately in some instances, or in combination with other aspects and features of the disclosure in other instances. Accordingly, while the disclosure is presented in terms of examples, it should be appreciated that individual aspects of any example can be claimed separately or in combination with aspects and features of that example or any other example.

The present disclosure is set forth in various levels of detail in this application and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. It should be understood that the claimed subject matter is not necessarily limited to the particular examples or arrangements illustrated herein.

BRIEF DESCRIPTION OF THE DRAWINGS

The accompanying drawings, which are incorporated into and constitute a part of the specification, illustrate examples of the disclosure and, together with the general description given above and the detailed description given below, serve to explain the principles of these examples.

DETAILED DESCRIPTION

Figure 1:
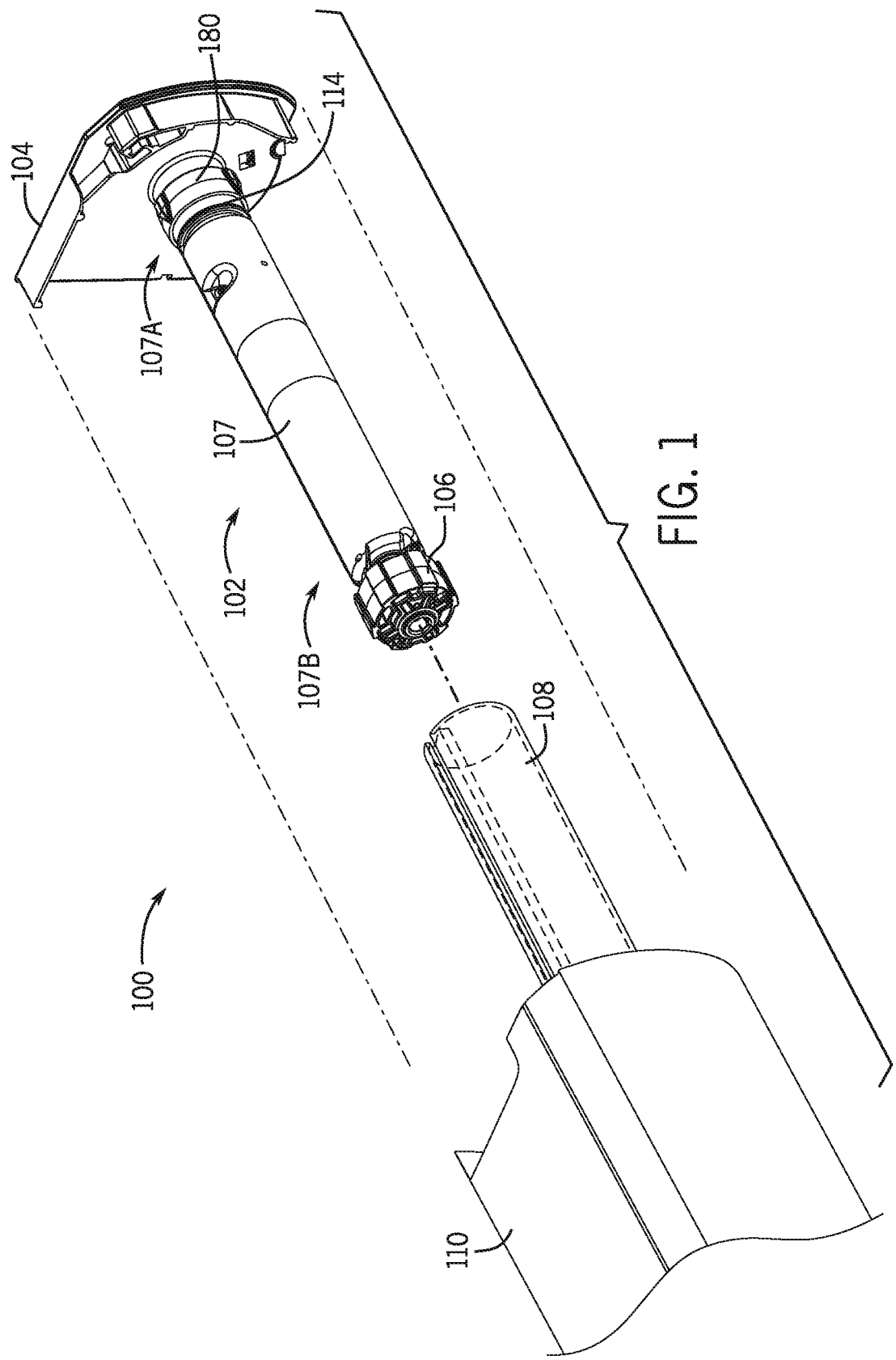
FIG. 1 is a partially exploded, fragmentary, isometric view of an architectural covering including a motor assembly in accordance with an embodiment of the present disclosure.

According to the present disclosure, a motor assembly for an architectural covering is provided. The covering may include a motor assembly configured to be coupled to an end cap. For example, the motor assembly may include a housing configured to engage the end cap in a non-rotatable manner. For example, the housing may include a splined end arranged to engage a corresponding splined boss of the end cap. In one embodiment, the motor assembly may be received at least partially within a roller tube and in driving engagement with the roller tube. In some embodiments, the housing may define an internal cavity, such as via first and second shells coupled together, in which a motor and a printed circuit board are received. The motor assembly may include a drive shaft and a drive structure for rotating the roller tube. In one embodiment, the drive structure may be removably coupled (e.g., selectively clamped) to the drive shaft, such as via relative axial movement between the drive structure and the drive shaft.

According to various aspects of the present disclosure, the features engaging the housing to the end cap may be the same, or substantially the same, across many products. For example, the housing may be generally universal such that different drive structures may be mounted for coupling with the drive shaft of the motor assembly. Additionally or alternatively, different bushings may be coupled to the housing, such as mounted over or around the housing, to accommodate different roller tubes. In one embodiment, the housing may engage different end caps regardless of the other features of the end caps (e.g., shapes, dimensions, etc.). For example, the various end caps may include a boss configured to receive the splined end of the housing regardless of the other features of the end caps.

The present disclosure illustrates an example of a covering 100 for an architectural structure/feature which includes a motor assembly 102. The motor assembly 102 may include a motor case or housing 107 (hereinafter "housing" for the sake of convenience without intent to limit) encasing or housing a motor 152 (see, e.g., FIG. 4) which is arranged to control operation of a covering material or element 302 (hereinafter "covering material" for the sake of convenience without intent to limit) (see, e.g., FIG. 17). For example, as described more fully below, selective operation of the motor 152 may move the covering material 302 between an extended position in which the covering material 302 at least partially covers an architectural structure or feature, and a retracted position in which the covering material 302 is at least partially retracted across the architectural structure/feature. The motor assembly 102 may be coupled, such as attached, to an end cap or plate 104 (hereinafter "end cap" for the sake of convenience without intent to limit) of the covering 100 in a manner that resists torsion loads so that the motor assembly 102 remains engaged to the end cap 104 during operation of the motor assembly 102, such as during operation of the motor 152. In some embodiments, the motor assembly 102 may include a drive structure 106 arranged to transmit movement of the motor 152, such as rotational movement of the motor's output, to the covering material 302 to extend and/or retract the covering material 302. For example, the drive structure 106 may be securely coupled to a drive shaft 202 of the motor 152 for improved accuracy and/or efficiency of the motor assembly 102, as described below. The motor housing 107 may be configured to insulate electrical components of the motor assembly 102 from potential electrostatic discharge to reduce the likelihood of damage to the electrical components. The motor assembly 102 may be fully-contained in a compact arrangement to permit the use of wider covering materials 302 within an architectural structure/feature, thereby reducing light leakage around the edges of the deployed covering material 302 relative to existing motor-driven coverings. The compact arrangement may be achieved by repackaging and attaching parts in a manner that eliminates some parts and reduces costs, resulting in design efficiency. For example, in previous motor assemblies, every part generally serves a single function. In the motor assembly 102, some parts may serve multiple functions (e.g., three or four functions), thereby improving the design efficiency of the motor assembly 102.

The motor housing 107 may be modular and may be designed for universal use with a broad range of coverings. Generally there are three parts that may be specific to a particular covering: an end cap, which may have a configuration corresponding to a particular shape of a predetermined head rail for a predetermined product; a bushing, which rotatably supports a roller tube and which may have a configuration specific to a preselected roller tube being used for a preselected covering; and a drive member, which links the roller tube to the motor housing and which may have a configuration specific to the predetermined roller tube being used for the predetermined covering. Different coverings may include roller tubes of different sizes and shapes. For example, and without limitation, a larger roller tube may be needed for a larger sized or heavier covering, or vice-versa. In some embodiments, the size of the roller tube may be selected based on the structure of the covering material 302. To accommodate different sizes of roller tubes, the drive structure 106 and a bushing 180 (see FIGS. 1 and 11, for example) selected for use with the housing 107 may be changed to interface with the specific roller tube being used for the covering, but the housing 107 may remain the same (e.g., the same for any of a variety of different coverings, including different roller tubes, drive structures, and/or bushings). The housing 107 may be designed to engage with any of these product-specific parts and may remain the same for use with a broad range of coverings. The mounting features between the motor housing 107 and the end cap 104 may be the same, or substantially the same, across many products. In some embodiments, the motor housing 107 may be generally universal in that not only different drive structures may be mounted for coupling with a motor drive shaft, but also different bushings for roller or rotator tubes (hereinafter "roller tube" for the sake of convenience without intent to limit) may be mounted over or around the motor housing 107, and a splined end of the motor housing 107 may fit in different end caps having a boss configured to receive the splined end regardless of other features of the end caps (e.g., shapes, dimensions, etc.).

As shown in the illustrative embodiment of FIG. 1, a first end 107A of the housing 107 may be coupled with the end cap 104, and a second end 107B of the housing 107 may be spaced a distance from the end cap 104. The motor assembly 102 may be axially aligned with a roller tube 108 (it will be appreciated that only a portion of the roller tube 108 is shown in FIG. 1 for illustrative purposes without intent to limit), and the drive structure 106 may be operatively associated with the motor 152 for rotating the roller tube 108. In this manner, the drive structure 106 may rotate the roller tube 108 to extend or to retract a shade (such as the covering material 302) suspended from the roller tube 108 depending on the rotation direction of the drive structure 106. In some embodiments, the drive structure 106 may be positioned adjacent the second end 107B of the housing 107, though other configurations are contemplated, including being positioned adjacent the first end 107A of the housing 107. The end cap 104 may enclose an open end of a head rail 110, which may substantially hide the roller tube 108 from view when mounted in an architectural structure/feature.

In one embodiment, the housing 102 may be configured for engagement with the end cap 104 to non-rotatably secure the motor assembly 102 to the end cap 104. For example, referring to FIG. 2, the housing 107 may be configured for splined engagement with the end cap 104 to non-rotatably secure the motor assembly 102 to the end cap 104. The first end 107A of the housing 107 may include a first spline feature 112 extending lengthwise along a length of the motor assembly 102, and a boss 114 of the end cap 104 may include a second spline feature 118 extending lengthwise along a length of the boss 114. The first spline feature 112 and the second spline feature 118 may be configured to engage each other such that the first end 107A of the housing 107 is substantially non-rotatable relative to the end cap 104. In the illustrative embodiment of FIG. 2, the first spline feature 112 may include two or more external ribs or splines 120 (hereinafter "splines" for the sake of convenience without intent to limit) arranged around a periphery of the first end 107A of the housing 107, and the second spline feature 118 may include two or more internal grooves 122 formed in an inner surface 123 of the boss 114. The external splines 120 and the internal grooves 122 may correspond in cross-sectional size and shape to provide a substantially non-rotatable engagement between the housing 107 and the end cap 104. In other embodiments, the first spline feature 112 may include two or more internal grooves formed in an external surface of the first end 107A of the housing 107, and the second spline feature 118 may include two or more internal splines arranged around the inner surface 123 of the boss 114.

Figure 2:
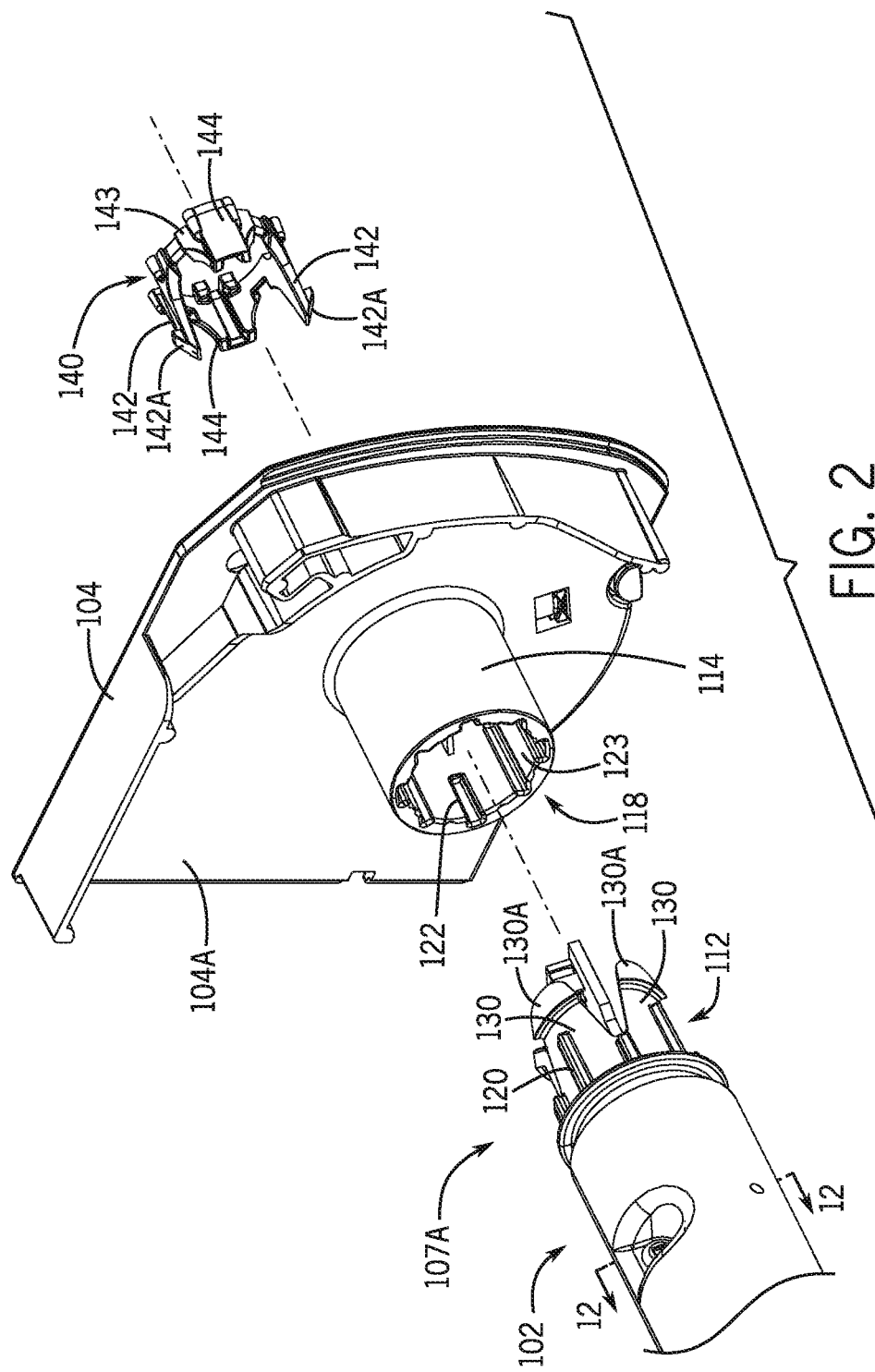
FIG. 2 is a partially exploded, fragmentary, isometric view of the motor assembly, an end cap, and an insert of FIG. 1 in accordance with an embodiment of the present disclosure.

As illustrated in FIG. 2, the first end 107A of the housing 107 and the boss 114 may be axially aligned with each other. To engage the first spline feature 112 and the second spline feature 118, the first end 107A of the housing 107 may be inserted into the boss 114 such that the first spline feature 112 slidably engages the second spline feature 118. Once engaged with each other, the first spline feature 112 and the second spline feature 118 may inhibit the motor assembly 102 from rotating relative to the end cap 104.

Figure 5:
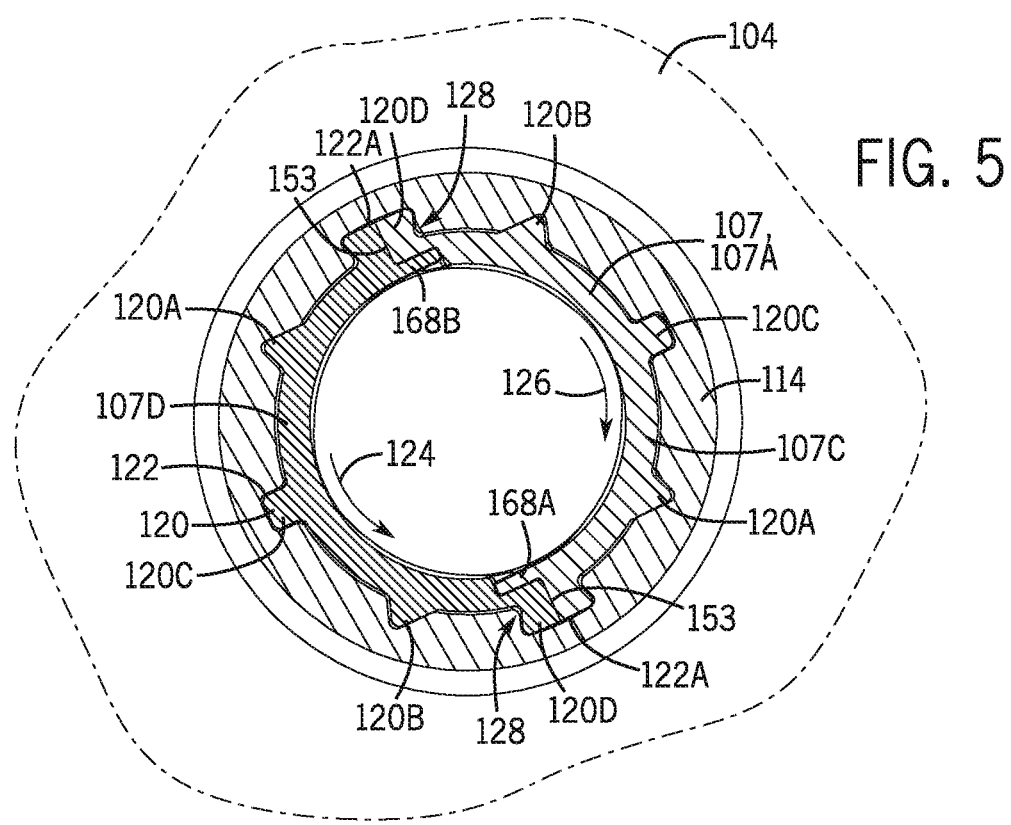
FIG. 5 is a transverse cross-sectional view of a splined engagement of a motor housing and an end cap of FIG. 1 in accordance with an embodiment of the present disclosure.

In the illustrative embodiment of FIG. 5, the first end 107A of the housing 107 is in splined engagement with the boss 114 of the end cap 104. The external splines 120 may be received in the internal grooves 122 to resist rotation of the motor assembly 102 relative to the end cap 104. One or more splines of the external splines 120 may include torque combative features to further resist rotation of the motor assembly 102 relative to the end cap 104. For example, some of the external splines 120 may be formed asymmetrically to resist more torque in one rotational direction relative to an opposite rotational direction. For instance, in the illustrative embodiment of FIG. 5, the external splines 120 include splines 120A with asymmetrical cross-sections designed to withstand more torque transferred from the motor assembly 102 to the boss 114 in a first direction 124 (counterclockwise in FIG. 5) than a second direction 126 (clockwise in FIG. 5), and the external splines 120 include splines 120B with asymmetrical cross-sections designed to withstand more torque transferred from the motor assembly 102 to the boss 114 in the second direction 126 than the first direction 124. The external splines 120 may include one or more splines 120C with symmetrical cross-sections designed to withstand substantially the same amount of torque in the first direction 124 and the second directions 126.

With continued reference to FIG. 5, one or more external splines 120 and one or more internal grooves 122 may be sized and shaped to interlock together to limit movement of the housing 107 relative to the boss 114. For example, and without limitation, one or more external splines 120 and one or more internal grooves 122 may form a securement feature to ensure the splines 120 and the grooves 122 remain in engagement during operation of the motor assembly 102, such as limiting axial and/or rotational movement of the housing 107 relative to the boss 114. In the illustrative embodiment of FIG. 5, one or more splines 120D of the external splines 120 may include a dovetail feature 128 such that the one or more splines 120D and one or more grooves 122A of the internal grooves 122 may form a dovetail joint to maintain engagement of the splines 120D with the grooves 122A. The dovetail feature 128 may substantially prevent the first end 107A of the motor assembly 102 from collapsing and disengaging from the boss 114 of the end cap 104 during operation of the motor assembly 102.

Figure 3:
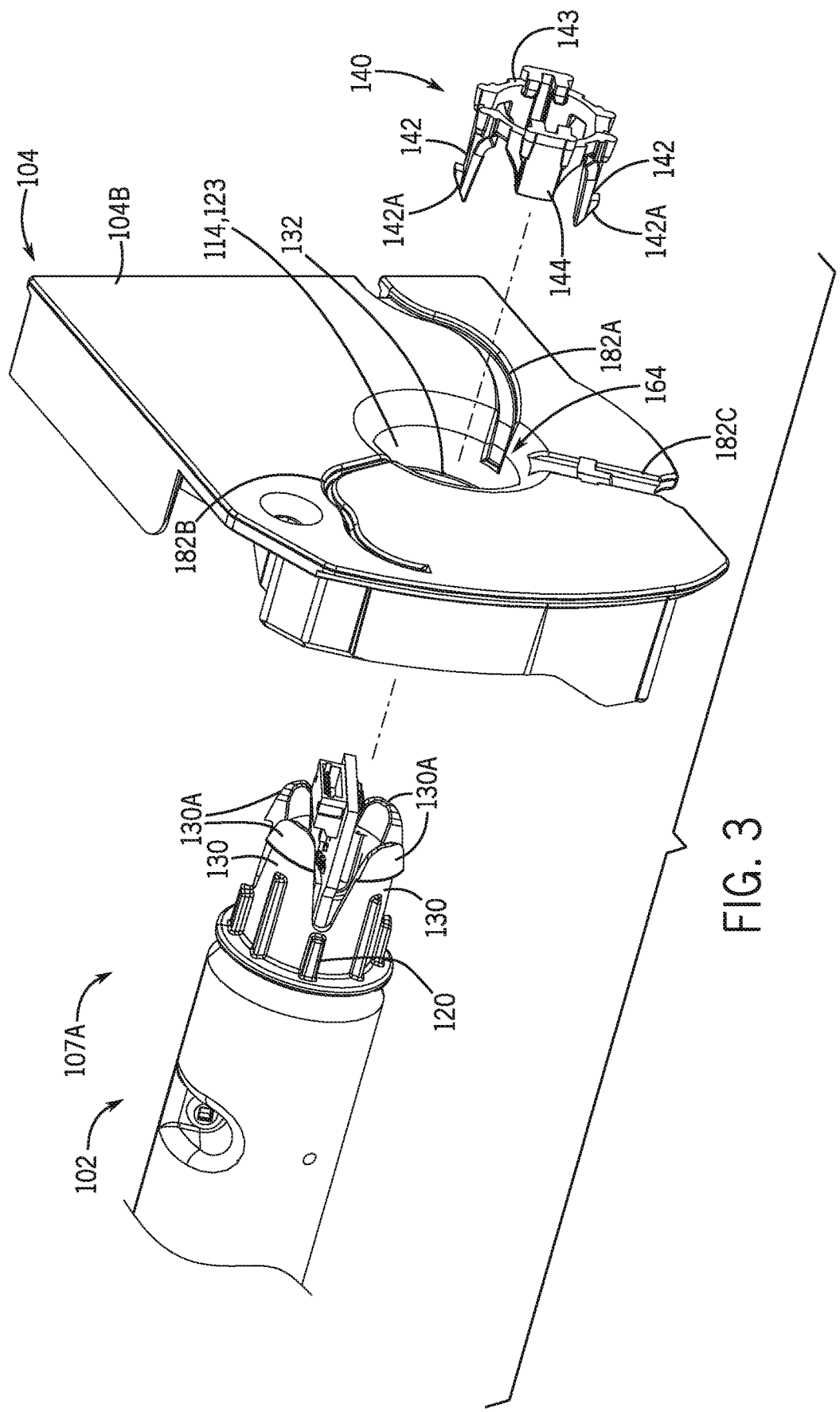
FIG. 3 is another partially exploded, fragmentary, isometric view of the motor assembly, end cap, and insert of FIG. 1 and viewed from a different angle compared to FIG. 2 in accordance with an embodiment of the present disclosure.

The motor assembly 102 may be attached to the end cap 104 of the covering 100 without the use of additional fasteners, such as screws. In some embodiments, the motor assembly 102 may be snapped to the end cap 104, such as via portions of the housing 107 (e.g., arm portions) being coupled to the end cap 104 via a snap connection, as explained below. In some embodiments, the snapped engagement may withstand loads under higher torque than previous motor assemblies and may have a compact package. The first end 107A of the housing 107 may snap into the boss 114 of the end cap 104 to secure the motor assembly 102 axially to the end cap 104. Referring to FIGS. 2 and 3, the first end 107A of the housing 107 may include two or more resilient arms 130 for axially securing the motor assembly 102 to the end cap 104. The resilient arms 130 may extend longitudinally from the first end 107A of the housing 107 towards the end cap 104 and may snap into the end cap 104. The resilient arms 130 may substantially prevent the housing 107 from collapsing and may splay outwardly to lock the housing 107 tighter into the end cap 104 under high torque. In other words, rotation of the motor housing 107 relative to the end cap 104 may cause the resilient arms 130 to flex outwardly, and the boss 114 of the end cap 104 may surround the resilient arms 130 and restrain the resilient arms 130, thereby maintaining the resilient arms 130 in engagement with the boss 114 and substantially preventing the motor assembly 102 from rotating relative to the end cap 104. Each resilient arm 130 may include a free, barbed end 130A for engaging the boss 114. During attachment of the motor assembly 102 to the end cap 104, the resilient arms 130 may slide along the inner surface 123 of the boss 114 until the barbed ends 130A of the resilient arms 130 snap into engagement with an internal wall 132 (see FIG. 6) of the end cap 104.

Figure 6:
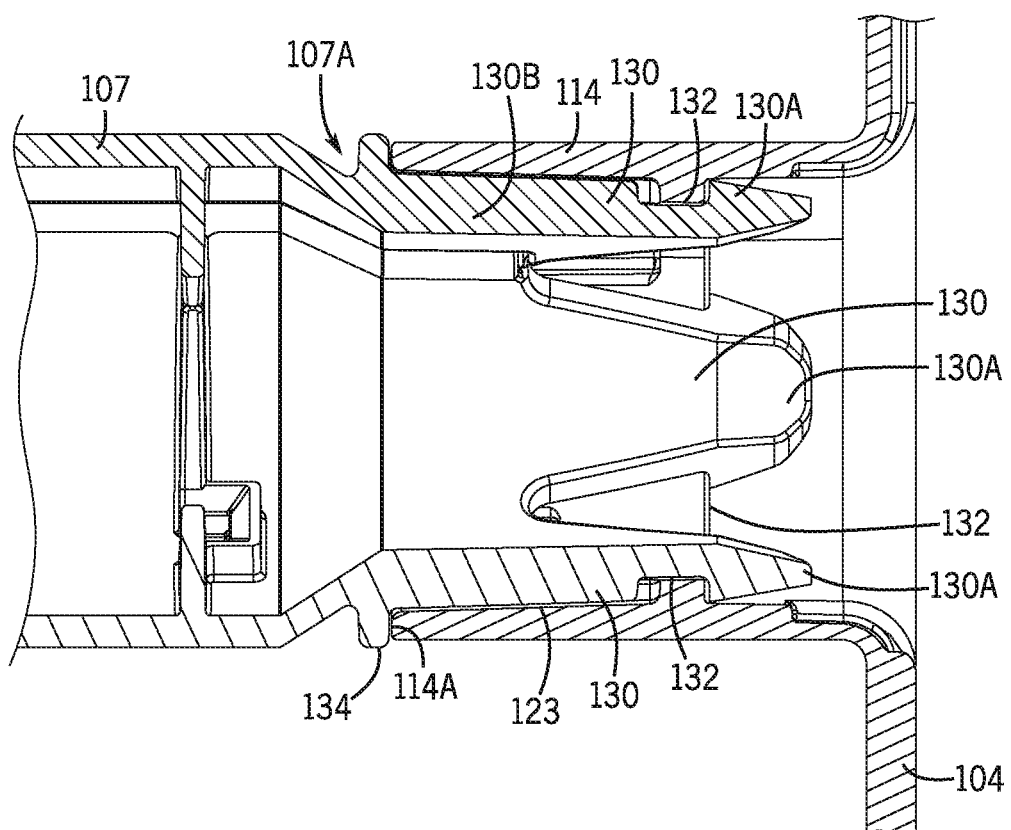
FIG. 6 is a lengthwise cross-sectional view of a latched engagement of a motor housing and an end cap of FIG. 1 in accordance with an embodiment of the present disclosure.

Referring to FIG. 6, the internal wall 132 may be formed as an internal ledge, rim, shoulder, or other internal structure of the end cap 104. Once engaged with the internal wall 132, the barbed ends 130A of the resilient arms 130 may substantially prevent the motor assembly 102 from being axially disconnected from the end cap 104. To provide a guide for an installer to ensure the barbed ends 130A of the resilient arms 130 are fully engaged with the internal wall 132 of the end cap 104, the first end 107A of the housing 107 may include an annular flange 134 located near a base 130B of the resilient arms 130. The annular flange 134 may abut against a distal surface 114A of the boss 114 substantially at the same time the barbed ends 130A of the resilient arms 130 engage the internal wall 132 to provide an indication to an installer that the motor assembly 102 is axially secured to, such as fully engaged with, the end cap 104. In the illustrative embodiment of FIGS. 2 and 3, one or more of the external splines 120 may extend longitudinally along a length of one or more of the resilient arms 130 to resist rotation of the resilient arms 130 relative to the boss 114.

Referring to FIGS. 2 and 3, the covering may include an insert 140 positioned on an opposite side of the end cap 104 relative to the motor assembly 102. The insert 140 may retain the motor 152 in engagement with the end cap 104 under axial impact load, such as during shipping. The insert 140 may provide wire management between components of the motor assembly 102, such as between electronics and a motor. The insert 140 may provide support for a printed circuit board. The insert 140 may be installed in two different orientations (e.g., orientations that are 180 degrees apart from each other).

Referring to FIGS. 2, 3, and 7-9, the insert 140 may include two or more resilient arms 142 for axially securing the insert 140 to the end cap 104. Each resilient arm 142 may include a free, barbed end 142A for engaging the end cap 104. The resilient arms 142 may extend longitudinally from a base 143 of the insert 140 towards the motor assembly 102. During attachment of the motor assembly 102 to the end cap 104, the resilient arms 142 may slide along the inner surface 123 of the boss 114 until the barbed ends 142A of the resilient arms 142 snap into engagement with an internal wall, such as the internal wall 132 (see FIG. 9) of the end cap 104. Once engaged with the internal wall 132, the barbed ends 142A of the resilient arms 142 may substantially prevent the insert 140 from being axially disconnected from the end cap 104.

Figure 7:
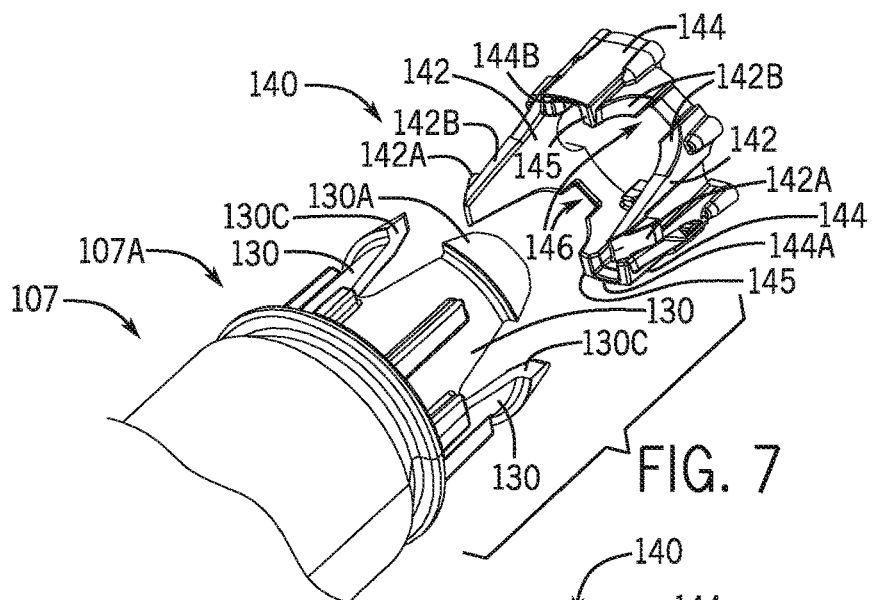
FIG. 7 is a partially exploded, fragmentary, isometric view of a motor housing and an insert of FIG. 1 in accordance with an embodiment of the present disclosure.
Figure 8:
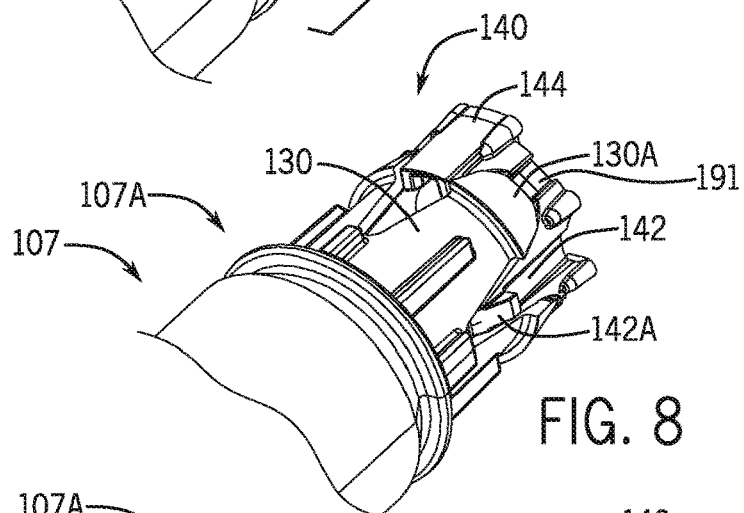
FIG. 8 is a fragmentary, isometric view of the motor housing and the insert of FIG. 7 nested together in accordance with an embodiment of the present disclosure.
Figure 9:
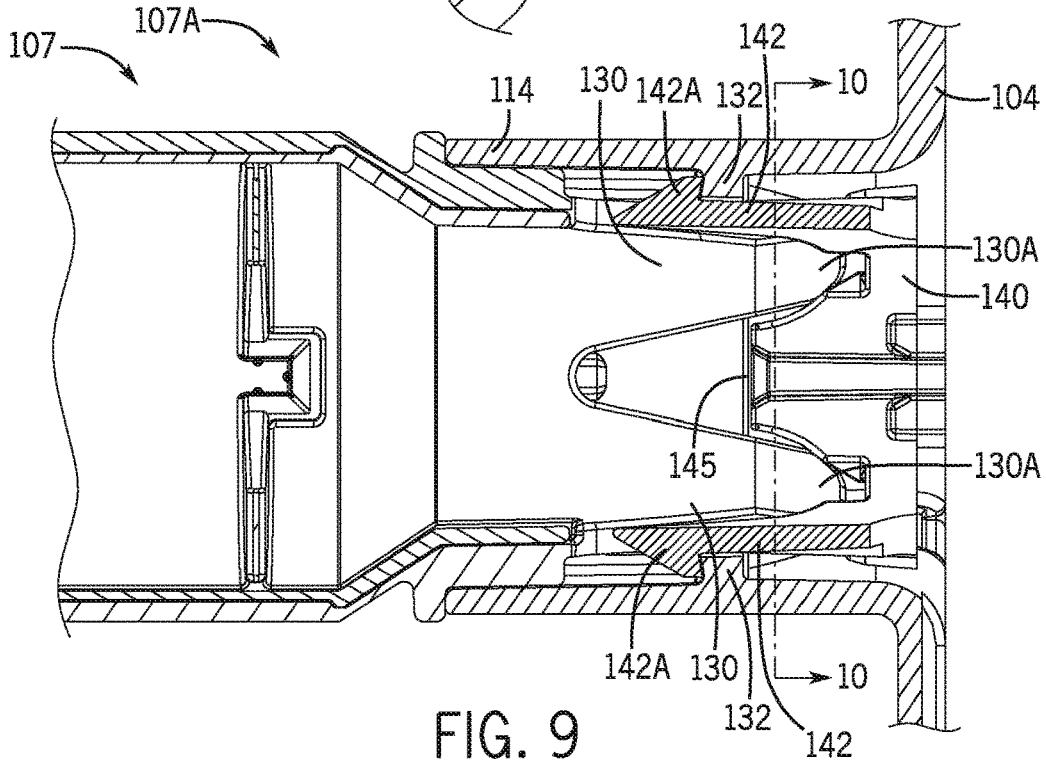
FIG. 9 is a lengthwise cross-sectional view of the motor housing and the insert of FIG. 7 engaged with an end cap of FIG. 1 in accordance with an embodiment of the present disclosure.

With reference to FIGS. 2, 3, 7, and 8, the motor assembly 102 and the insert 140 may be axially aligned with each other. The resilient arms 130 of the housing 107 and the resilient arms 142 of the insert 140 may extend in opposite directions and may be angularly positioned relative to each other such that the resilient arms 130 interdigitate with the resilient arms 142 when the motor assembly 102 and the insert 140 are attached to the end cap 104 (see FIG. 9). Referring to FIGS. 8 and 9, the barbed ends 130A of the housing 107 and the barbed ends 142A of the insert 140 may extend past one another when inserted into boss 114 such that the internal wall 132 is received between the respective barbed ends 130A, 142A when the motor assembly 102 and the insert 140 are snapped into engagement with the end cap 104.

Figure 10:
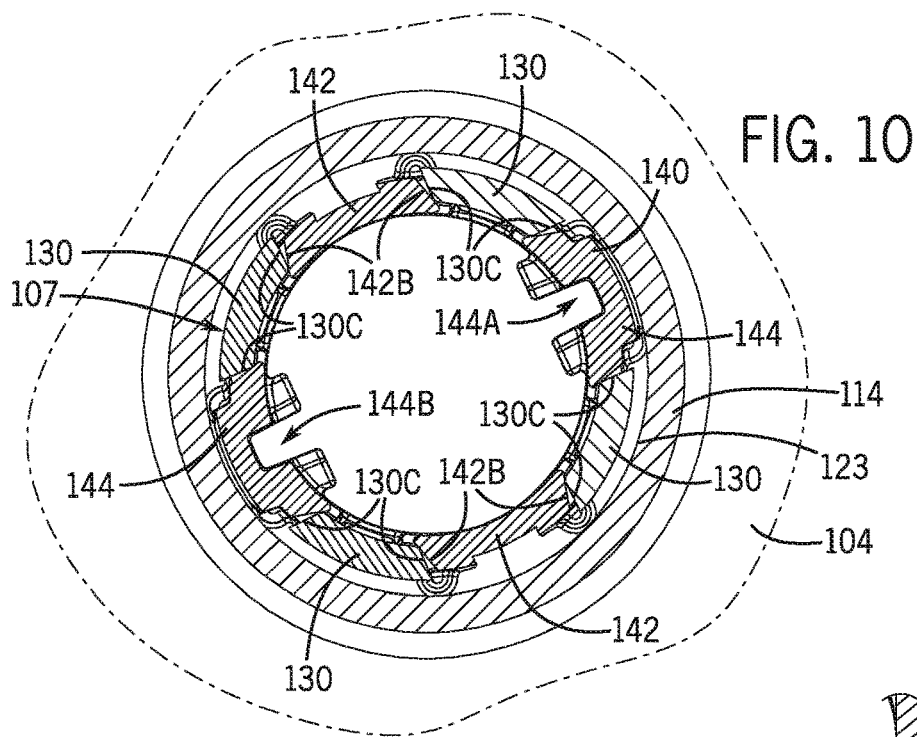
FIG. 10 is a transverse cross-sectional view of the motor housing and the insert of FIG. 7 taken along line 10-10 of FIG. 9 in accordance with an embodiment of the present disclosure.

Referring to FIG. 10, the insert 140 may lock the resilient arms 130 of the housing 107 in engagement with the end cap 104 to substantially prevent the resilient arms 130 from collapsing and disconnecting from the end cap 104 during operation of the motor assembly 102. In the illustrative embodiment of FIG. 10, the resilient arms 142 of the insert 140 may engage the resilient arms 130 of the housing 107 to maintain the barbed ends 130A of the resilient arms 130 in engagement with the internal wall 132 (see FIG. 9) of the boss 114. The resilient arms 142 of the insert 140 may bias the resilient arms 130 radially outwardly to maintain the engagement with the internal wall 132. To align and bias the resilient arms 130, each resilient arm 142 may include angled side walls 142B that taper outwardly in a direction inwardly from the boss 114 to form a wedge-like space between the angled side walls 142B and the inner surface 123 of the boss 114. The side walls 142B may extend along the length of the resilient arms 142 (see FIG. 7) and may engage corresponding surfaces of the resilient arms 130. In the illustrative embodiment of FIG. 10, each resilient arm 130 may include angled side walls 130C that taper toward each other as the side walls 130C extend inwardly away from the boss 114. The side walls 130C may extend along the length of the resilient arms 130 (see FIG. 7). The angled side walls 130C, 142B may facilitate alignment of the resilient arms 142 of the insert 140 between the resilient arms 130 of the motor assembly 102 and/or may facilitate the outward biasing of the resilient arms 130 of the housing 107 by the resilient arms 142 of the insert 140, such as by allowing the resilient arms 142 of the insert 140 to be wedged inwardly of the resilient arms 130 of the housing 107 to push the resilient arms 130 of the housing 107 into engagement with the inner surface 123 of the boss 114 to hold the motor assembly 102 in place relative to the boss 114. The resilient arms 142 of the insert 140 may apply pressure to the resilient arms 130 of the housing 107 to hold the motor assembly 102 in place during impact, such as axial impact. The resilient arms 142 may have a curved shape with a chamfer, such as the angled side walls 142B, that pushes the resilient arms 130 outwardly to lock the motor housing 107 to the end cap 104.

Figure 11:
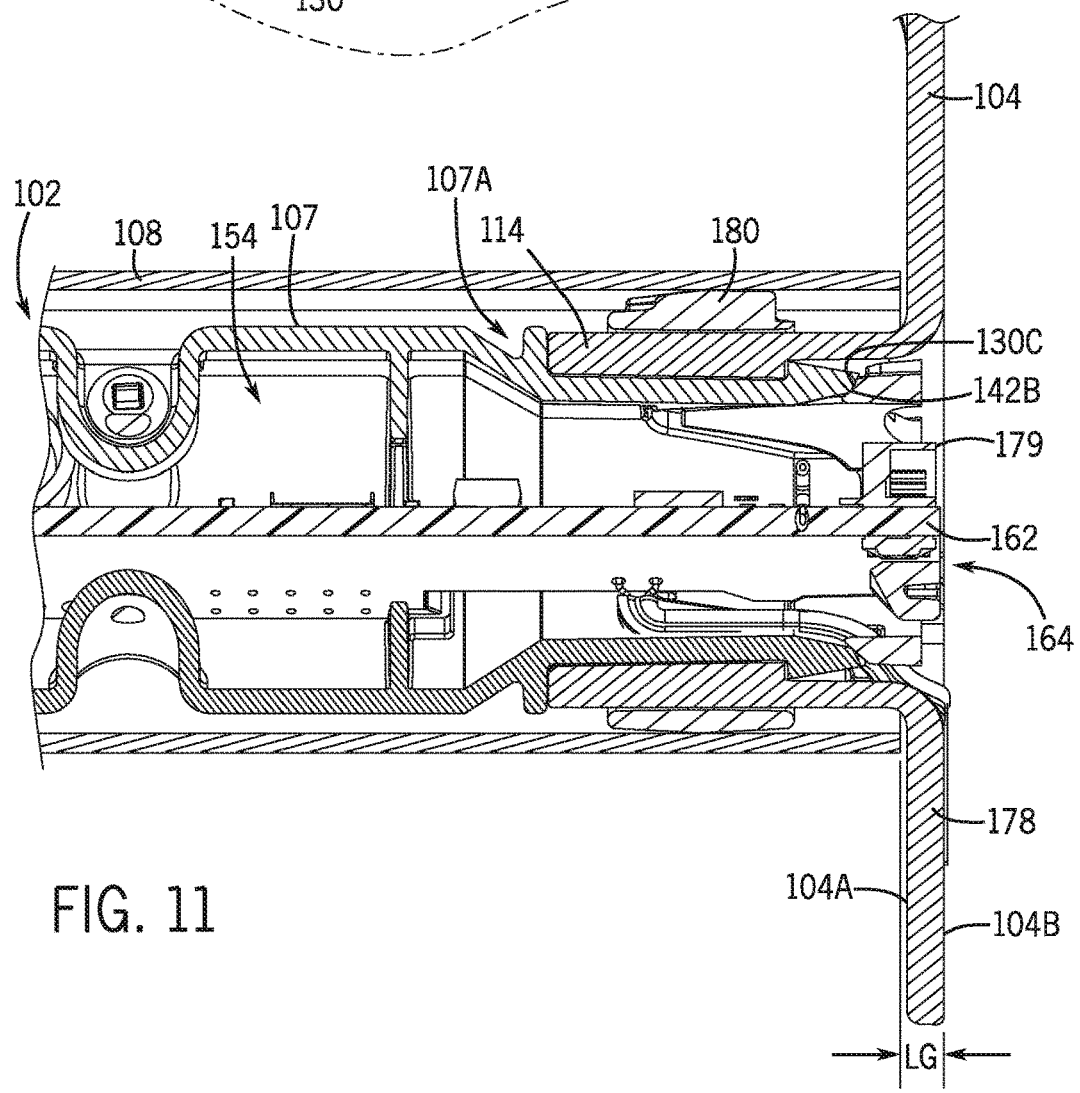
FIG. 11 is a lengthwise cross-sectional view of the motor assembly, an end cap, and an insert of FIG. 1 in accordance with an embodiment of the present disclosure.

Referring to FIGS. 2, 3, and 7, the resilient arms 142 of the insert 140 may be separated from one another by stop portions 144 of the insert 140. The stop portions 144 may define a shoulder 145 at a leading edge of the stop portions 144 for abutting against the internal wall 132 of the boss 114 (see FIG. 9) substantially at the same time the resilient arms 142 of the insert 140 engage the internal wall 132 of the boss 114 to axially secure the insert 140 to the end cap 104. A cove 146 may be formed between adjacent stop portions 144 and resilient arms 142, and the coves 146 may be sized and shaped to receive the barbed ends 130A of the resilient arms 130. The angled side walls 142B may continue around the coves 146 and engage inner surfaces of the barbed ends 130A to further lock the barbed ends 130A in engagement with the internal wall 132 of the boss 114 (see FIG. 9). Referring to FIG. 11, the angled side walls 130C of the resilient arms 130 may continue around the barbed ends 130A to facilitate the engagement of the barbed ends 130A with the angled side walls 142B in the coves 146. Referring to FIGS. 7 and 10, the stop portions 144 may define receiving grooves 144A, 144B extending longitudinally along the length of the insert 140 for supporting one or more components of the motor assembly 102.

To couple the motor assembly 102 with the end cap 104, in one embodiment, illustrated in FIG. 2, the first spline feature 112 of the housing 107 may be aligned with the second spline feature 118 of the boss 114, and then the first end 107A of the housing 107 may be inserted into the internal bore 164 of the boss 114 to engage the first and second spline features 112, 118 such that the motor assembly 102 is substantially non-rotatable relative to the end cap 104. Referring to FIG. 6, the first end 107A of the housing 107 may continue to be inserted into the internal bore 164 of the boss 114 to engage the barbed ends 130A of the resilient arms 130 with the internal wall 132 of the boss 114 and abut the annular flange 134 of the housing 107 against the distal surface 114A of the boss 114, thereby axially securing the motor assembly 102 to the end cap 104. The insert 140 may be inserted into the internal bore 164 from an opposite side of the end cap 104 relative to the motor assembly 102 to engage the resilient arms 142 of the insert 140 with the resilient arms 130 of the motor assembly 102 to further lock the motor assembly 102 to the end cap 104. The resilient arms 142 of the insert 140 may engage the internal wall 132 to secure the insert 140 to the end cap 104.

Figure 4:
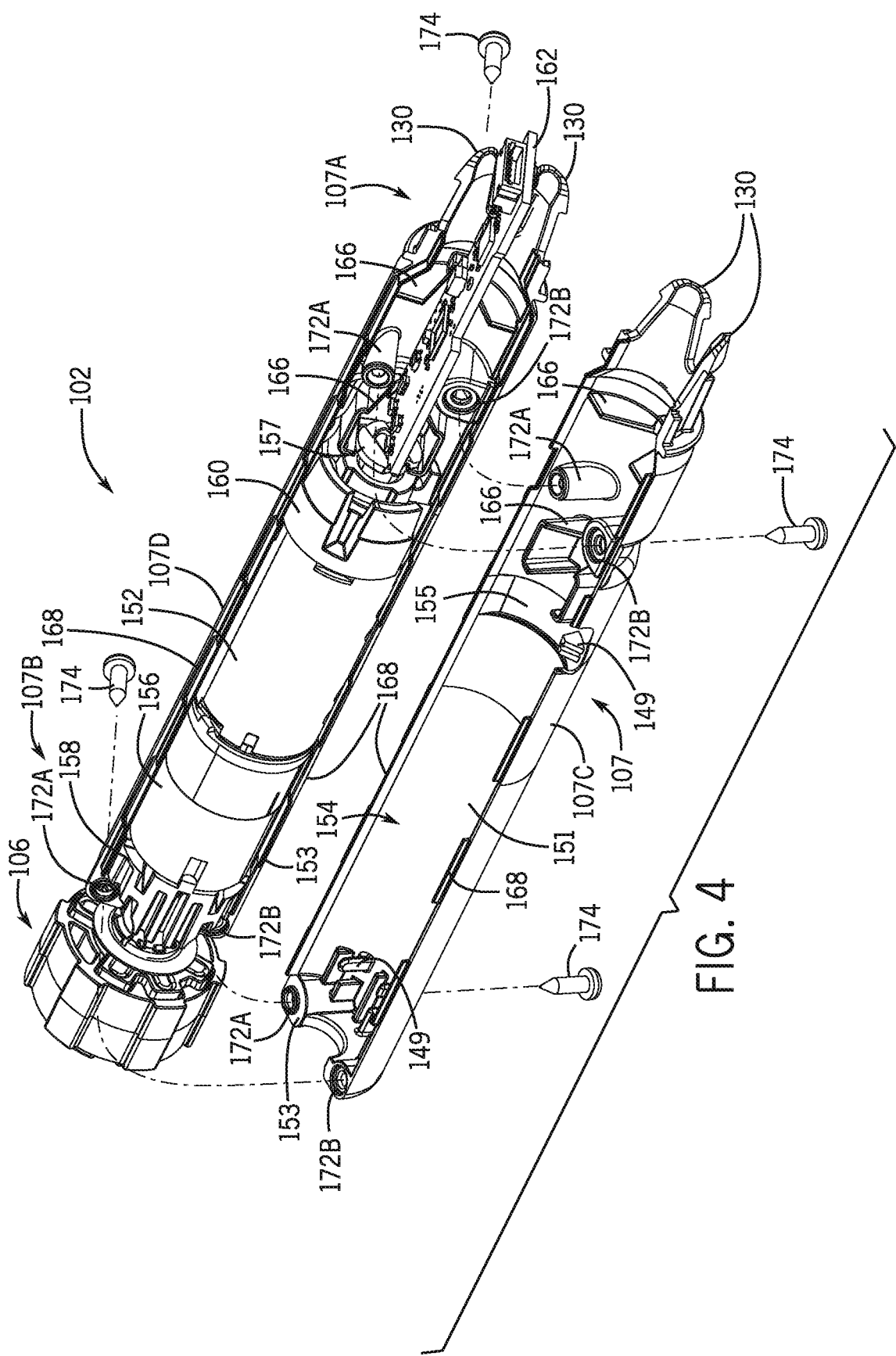
FIG. 4 is a partially exploded, fragmentary, isometric view of the motor assembly of FIG. 1 in accordance with an embodiment of the present disclosure.

Referring to FIG. 4, the motor assembly 102 may include a motor 152 received in the housing 107. The motor 152 may be non-rotatably and non-slidably received in the housing 107. For example, the housing 107 may include ribs 149 projecting inwardly from an inner surface 151 of the housing 107. The ribs 149 may function as a torque control feature for the motor 152 and may engage corresponding features on the motor 152 or motor mounts associated therewith for transferring torque from the motor 152 to the housing 107. A recess 155 formed in the inner surface 151 of the housing 107 may receive a portion of the motor 152 or a motor mount associated therewith for locating the motor 152 axially within the housing 107.

Referring still to FIG. 4, the housing 107 may include a first shell 107C and a second shell 107D that may be attached together to substantially encapsulate the motor 152. In the illustrative embodiment of FIG. 4, the first shell 107C is separated from the second shell 107D to show the internal components of the motor assembly 102 seated in the second shell 107D. The first and second shells 107C, 107D may be identical to each other, and thus the second shell 107D may include the same internal features as the first shell 107C illustrated in FIG. 4. In these embodiments, only one mold may be needed to form the housing 107, and assembly of the housing 107 may be easier because the assembler may reach for two of the same housing shell, rather than searching for two different housing shells. The first and second shells 107C, 107D may be referred to as components or pieces herein without intent to limit. When assembled together, the two shells 107C, 107D may define an internal cavity 154 and may form an interface 153 between the shells 107C, 107D. The motor assembly 102 may include a gear unit 156 that alters a torque output of the motor 152; an encoder 157 that counts the number of rotations of a shaft of the motor 152, such as via a magnetic encoder, so one or more components of the printed circuit board 162 may track a position of a shade for shade position control; one or more dampers or motor mounts 158, 160 that dampen motor vibrations; and a printed circuit board 162 for controlling operation of the motor 152, all of which may be received within the internal cavity 154. Depending on the particular application, the drive structure 106 and the encoder 157 may be positioned adjacent opposite ends of the motor 152, which may provide a compact arrangement of the motor assembly 102. The encoder 157 may include a spinning magnet wheel mounted on a shaft of the motor 152, and wires may be routed within the housing 107 around the wheel to protect the wires from touching the spinning wheel. The motor mounts 158, 160 may receive the ribs 149 for transferring torque from the motor 152 to the housing 107, and one of the motor mounts 160 may be seated in the recess 155 for locating the motor 152 axially within the housing 107.

Figure 12:
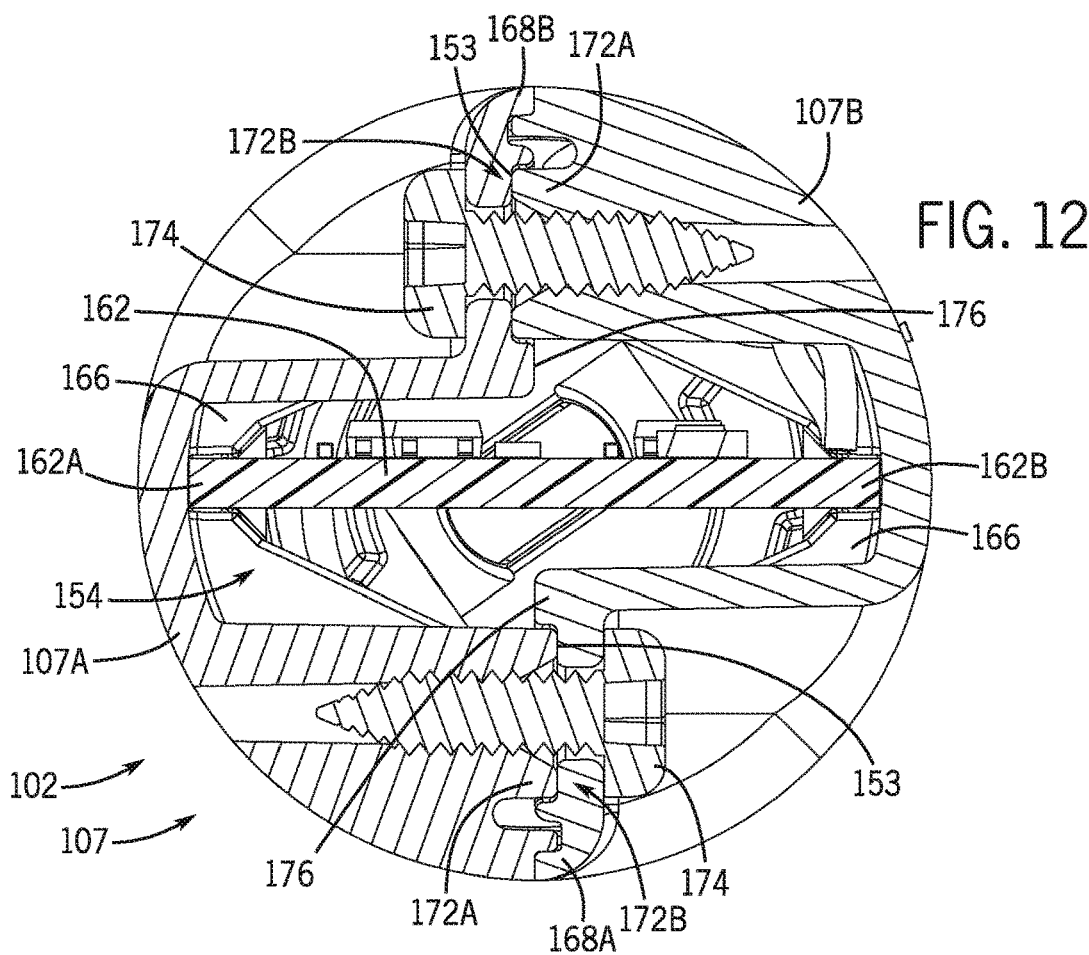
FIG. 12 is a transverse cross-sectional view of the motor assembly of FIG. 1 taken along line 12-12 of FIG. 2 in accordance with an embodiment of the present disclosure.

Static electricity discharge through the printed circuit board 162 may be mitigated or reduced at least in part because of the printed circuit board 162 being substantially enclosed inside the motor assembly 102 and/or the end cap 104 to electrically and physically isolate the printed circuit board 162 from static energy generated from operation of the covering 100 or from a user interacting with the covering 100. Referring to FIGS. 4, 11, and 12, the housing 107 may protect the printed circuit board 162 from electrostatic discharge by substantially encapsulating the printed circuit board 162 within the internal cavity 154. Static energy may be generated during operation of the covering 100 or from users contacting the covering 100. The static energy may be transferred to the roller tube 108 in which the motor assembly 102 may be at least partially received (see FIG. 11). To protect the printed circuit board 162 from electrostatic discharge from the roller tube 108 or other components of the covering 100, the printed circuit board 162 may be substantially entirely received within the housing 107 and the boss 114. For example, the printed circuit board 162 may be surrounded along substantially its entire length by the housing 107 and the boss 114 (see FIG. 11). In some embodiments, electrostatic discharge through the printed circuit board 162 may be mitigated in other manners, which may or may not be combined with enclosing the printed circuit board 162 inside the motor assembly 102 and/or the end cap 104, discussed above. For example, in one non-limiting example, the printed circuit board 162 may include transient voltage suppression (TVS) diodes for protecting at least outside traces and ground planes.

Referring to FIG. 11, the printed circuit board 162 may extend within the first end 107A of the housing 107. The first end 107A of the housing 107 may be open and in communication with an internal bore 164 of the end cap 104 that opens through an outer face 104B of the end cap 104, thereby providing access for electrical wiring, such as an antenna wire and power cabling, to connect to the printed circuit board 162 and be routed out of the housing 107. As illustrated in FIG. 11, the boss 114 of the end cap 104 may at least partially define the internal bore 164 and may at least partially surround the first end 107A of the housing 107, thereby further insulating the printed circuit board 162 from electrostatic discharge of the roller tube 108 near the first end 107A of the housing 107. The outer face 104B of the end cap 104 may be mounted to a structure at least partially defining the architectural feature, such as substantially flush with the structure, thereby substantially enclosing the internal bore 164 and the printed circuit board 162. The housing 107 and the end cap 104 may be formed of an insulating material to isolate the printed circuit board 162 from static electricity discharge from the roller tube 108 or other components of the covering 100.

Figure 13:
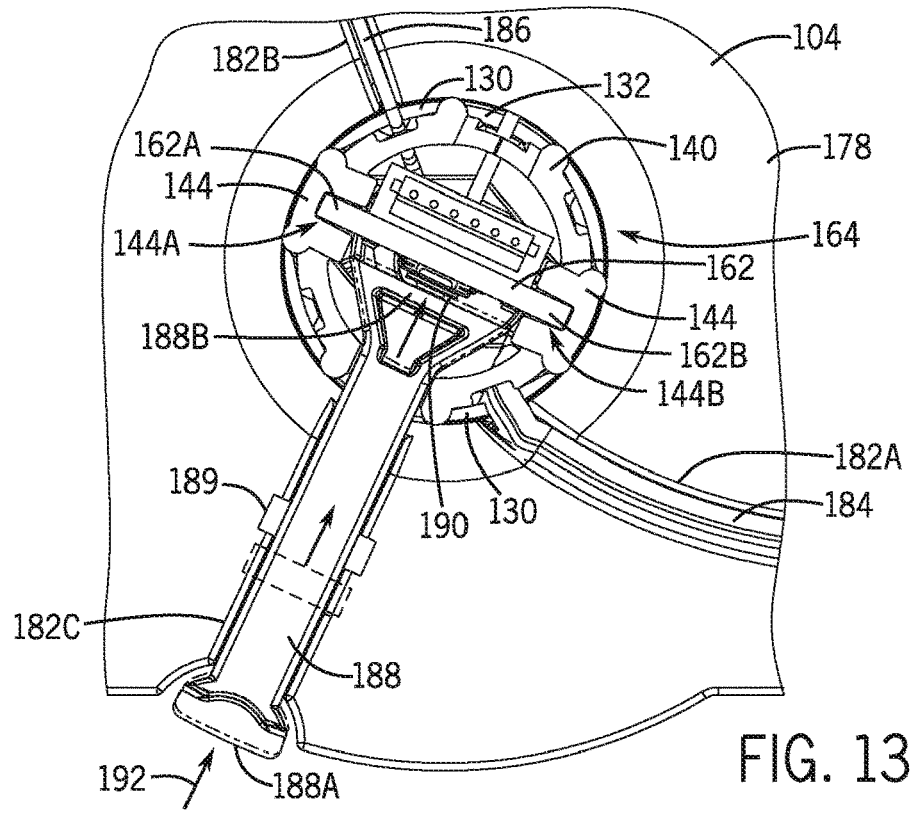
FIG. 13 is a fragmentary end view of an outer surface of an end cap of FIG. 1 in accordance with an embodiment of the present disclosure.

Referring to FIG. 4, the printed circuit board 162 may be substantially axially aligned with the motor 152. The printed circuit board 162 may be secured within the housing 107 by friction without the use of fasteners contacting or extending through the printed circuit board 162, or holes being formed in the housing 107, to reduce the likelihood of static electricity passing through a fastener to the printed circuit board 162. As illustrated in FIGS. 4 and 12, the printed circuit board 162 may be supported along its longitudinal edges 162A, 162B (see FIG. 12) by two or more ribs or supports 166 (hereinafter "supports" for the sake of convenience without intent to limit) formed in the first and second shells 107C, 107D and spaced along the length of the printed circuit board 162. When the first and second shells 107C, 107D are attached together, the printed circuit board 162 may be supported along one of its longitudinal edges 162A (see FIG. 12) by the first shell 107C and along the other of its longitudinal edges 162B (see FIG. 12) by the second shell 107D, and the supports 166 may capture the longitudinal edges 162A, 162B (see FIG. 12) of the printed circuit board 162 to limit or substantially prevent movement of the printed circuit board 162 relative to the housing 107. In some embodiments, the printed circuit board 162 and/or the supports 166 may be sized such that the printed circuit board 162 is interference fit into the supports 166 so that the edges 162A, 162B (see FIG. 12) of the printed circuit board 162 frictionally engage the supports 166. The supports 166 may form a substantially rectangular box and may provide alignment of the printed circuit board 162. Additionally or alternatively, as illustrated in FIG. 13, the printed circuit board 162 may be supported along its longitudinal edges 162A, 162B by the insert 140. For example, as seen in FIG. 13, the receiving grooves 144A, 144B of the insert 140 may be sized to receive the longitudinal edges 162A, 162B of the printed circuit board 162 to further support the printed circuit board 162.

Referring to FIGS. 4, 5, and 12, the first and second shells 107C and 107D may overlap each other along the interface 153 to protect the printed circuit board 162 from static electricity discharge. Referring to FIG. 4, the first shell 107C and/or the second shell 107D may include a lip 168 extending along the longitudinal length of the housing 107 at the interface 153. The lip 168 may be formed as a continuous structure or as a series of discontinuous structures formed along the length of the both shells 107C, 107D that interdigitate with one another when the shells 107C, 107D are attached together, as described in further detail below. The lip 168 may form an extra layer of protection at the interface 153 of the housing 107 to further protect the printed circuit board 162 from electrostatic discharge through the interface 153. The first and second shells 107C, 107D may be flexible, and the lip 168 may help with rigidity of the housing 107.

For example, as the motor housing 107 twists, the sides of the housing 107 may shift, and the lip 168 may prevent the sides of the housing 107 from shifting with respect to one another.

Referring to FIG. 5, a cross-sectional view of the first end 107A of the motor assembly 102 illustrates the first and second shells 107C, 107D overlapping each other at the interface 153. In the illustrative embodiment of FIG. 5, the first shell 107C includes a first lip 168A that overlaps the second shell 107D along one of the longitudinal interfaces 153 of the housing 107, and the second shell 107D includes a second lip 168B that overlaps the first shell 107C along the other of the longitudinal interfaces 153 of the housing 107. The first shell 107C or the second shell 107D may include both lips 168A, 168B in some embodiments, or, as previously discussed, the lips 168A, 168B may be discontinuous such that the lips alternate on the shells 107C, 107D along the length of a respective longitudinal interface 153.

The first shell 107C and/or the second shell 107D may be coupled together in various manners. For example, in one embodiment, illustrated in FIG. 4, screw boss features 172A, 172B may be formed in the first shell 107C and/or the second shell 107D to receive fasteners, such as the illustrated screws 174 or other fasteners, to secure the shells 107C, 107D together. To shield or insulate the printed circuit board 162 from static electricity, the shells 107C, 107D may overlap one another along the interface 153 between the respective screw boss features 172A, 172B to provide a static electricity barrier. In the illustrative embodiment of FIG. 4, the screw boss features 172 may include screw bosses 172A and pockets 172B for receiving a leading end portion of the screw bosses 172A. The screw bosses 172A may be received in the pockets 172B when the first and second shells 107C, 107D are attached together. As shown in the illustrative embodiment of FIG. 12, respective rims 176 may at least partially define the respective pockets 172B and may at least partially surround the leading end portions of the respective screw bosses 172A when the first and second shells 107C, 107D are attached together. The rims 176 may overlap the screw bosses 172A to protect the printed circuit board 162 from static electricity discharge through the interface 153 between the screw bosses 172A and pockets 172B. Referring still to FIG. 12, the printed circuit board 162 may be oriented substantially perpendicular to the interface 153 along a bisecting plane of the first and second shells 107C, 107D to space the printed circuit board 162 from the interface 153 along both longitudinal edges of the shells 107C, 107D to reduce the risk of a static electricity arching from a fastener, through a respective interface 153, and to the printed circuit board 162. In some embodiments, a sleeve made of a flexible heat-shrink plastic material may be shrunk around the housing 107 to further provide a static electricity barrier.

Referring to FIGS. 4 and 11, the printed circuit board 162 may include all or substantially all of the circuitry for operation of the motor 152. For example, the printed circuit board 162 may include motor control circuitry for controlling operation of the motor 152 and radio circuitry for receiving and/or transmitting signals related to operation of the motor 152. In some embodiments, encoder and radio circuitry are combined into a single circuit board, such as the printed circuit board 162, that is sized to fit in the housing 107. By including all or substantially all of the circuitry for operation of the motor 152 within the housing 107 and the internal bore 164 of the end cap 104, the motor assembly 102 may be attached to the end cap 104 with little or no electrical components positioned around the boss 114 of the end cap 104 adjacent an inner face 104A of the end cap 104. For example, the motor assembly 102 may eliminate a cartridge for a printed circuit board located outside the housing 107 and along the end cap 104 (as found in some existing motor assemblies), where the cartridge would contribute to a light gap. Eliminating the cartridge may reduce the amount of plastic and may reduce the part count by about thirty percent, resulting in a cost reduction. As an example of a part reduction, the screw that attaches prior cartridges to an end cap may be eliminated. The components of the printed circuit board 162 may be positioned on the board in a space-saving efficient manner which may eliminate the need for a different board depending on whether the motor assembly 102 is attached to a right or left end cap. In other words, in some embodiments the same printed circuit board 162 may be used regardless of the orientation of the motor assembly 102 within the head rail 110. The printed circuit board 162 may include a motor module including software that is generic to various types of coverings, rather than product-specific software.

Referring to FIG. 11, at least a portion of the printed circuit board 162 may be readily accessible through the internal bore 164 of the end cap 104 for software programming, reloads, and/or updates without disassembling the covering 100. For example, as seen in FIG. 11, the printed circuit board 162 may include a port 179, such as an input/output port, that is easily accessible through the internal bore 164 of the end cap 104 and may be used for software reloads and/or updates. To access the port 179, the end cap 104 may be removed from a mounting bracket (not shown) with the covering fully assembled, and a tool (such as a portable electronic device) containing the reload and/or update software may be connected to the port 179 to reload and/or update the software for the motor assembly 102. After reloading and/or updating the software, the tool may be disconnected from the port 179 and the end cap 104 may be coupled to the mounting bracket (not shown). This process may be completed with the covering 100 in a fully assembled configuration.

Referring still to FIG. 11, because of the arrangement of the printed circuit board 162 within the housing 107 and the end cap 104 (and the consequent elimination of a separate cartridge typically mounted between prior art motor assemblies and end caps to contain the printed circuit board), the roller tube 108 may extend to a point substantially flush with an inner face 104A of the end cap 104, and a shade may extend along the full length of the roller tube 108 to provide a reduced light gap LG between a respective edge of the shade and the structure to which the end cap 104 is attached. The reduced light gap LG may substantially correspond to the thickness of a base wall 178 of the end cap 104 defined by the distance between the inner face 104A and an outer face 104B of the end cap 104. The base wall 178 may be substantially planar and may be oriented substantially perpendicular to a rotational axis of the roller tube 108. The boss 114 may be oriented substantially perpendicular to the base wall 178 and may project inwardly from the base wall 178 toward the motor assembly 102.

Referring to FIG. 1, the roller tube 108 may be rotatably supported by the end cap 104. Referring to FIGS. 1 and 11, the roller tube 108 may be mounted on a bushing 180, which may be rotatably mounted onto a boss 114 of the end cap 104. The bushing 180 may engage an inner surface of the roller tube 108 so that the bushing 180 rotates substantially in unison with the roller tube 108 about the boss 114. The bushing 180 may define a substantially cylindrical inner surface that rotatably bears against a substantially cylindrical outer surface of the boss 114 during rotation of the roller tube 108. In some embodiments, the boss 114 may be monolithically formed with the end cap 104 as a single, unitary structure. The opposite end (not shown) of the roller tube 108 may be rotatably supported by another end cap in a similar manner. The motor assembly 102 may be attached to either a left or a right end cap of the covering 100.

With continued reference to FIG. 11, the printed circuit board 162 may be substantially flush or offset inwardly from the outer face 104B of the end cap 104 such that the outer face 104B of the end cap 104 may be mounted flush against a structure defining an architectural structure/feature, such as a window frame defining a window opening. Referring to FIGS. 3 and 13, the end cap 104 may define one or more channels in the base wall 178 that are recessed relative to the outer face 104B of the end cap 104. In the illustrative embodiment of FIGS. 3 and 13, the end cap 104 defines a first channel 182A and a second channel 182B both recessed relative to the outer face 104B and extending from the internal bore 164. As seen in FIG. 13, a portion of a power cable or cord 184 (hereinafter "cord" for the sake of convenience without intent to limit) providing power to the motor assembly 102 may be received within the first channel 182A and routed through the internal bore 164 for connection to the motor assembly 102, such as to the printed circuit board 162. The power cord 184 may be connected to a power source, such as a battery or an AC voltage source, to provide power to the motor assembly 102. The power cord 184 may extend off the printed circuit board 162 and be inserted into the first channel 182A. A portion of an antenna wire 186 for receiving and/or transmitting signals may be received within the second channel 182B and routed through the internal bore 164 for connection to the motor assembly 102, such as to the printed circuit board 162. A sticker or other securement element (such as a sticker which is commonly provided on a window covering bearing information relating to the window covering) may be used to hold the power cord 184 and/or the antenna wire 186 in place. As seen in FIG. 13, the power cord 184 and the antenna wire 186 may be routed between the insert 140 and the resilient arms 130. The insert 140 may hold the power cord 184 and the antenna wire 186 in place.

Referring to FIG. 13, in some embodiments the first channel 182A may be sized so that the portion of the power cord 184 received within the first channel 182A is substantially flush with or recessed relative to the outer face 104B of the end cap 104, and the second channel 182B may be sized so that the portion of the antenna wire 186 received within the second channel 182B is substantially flush with or recessed relative to the outer face 104B of the end cap 104. In this manner, when assembled, the power cord 184 and the antenna wire 186 may be substantially flush with the outer face 104B to allow flush mounting of the end cap 104 to minimize a light gap between the architectural covering 100 and the structure to which the end cap 104 is mounted.

With continued reference to FIG. 13, an actuation member 188 for manually controlling the motor 152 may be slidably coupled to the end cap 104. The actuation member 188 may be received within a channel 182C (see FIGS. 3 and 13) formed in the end cap 104 such that the actuation member 188 may be substantially flush with the outer face 104B of the end cap 104, and the actuation member 188 may be coupled to the end cap 104 with one or more tabs 189. The actuation member 188 may selectively engage the printed circuit board 162 to actuate the motor assembly 102. As seen in the illustrative embodiment of FIG. 13, the actuation member 188 may have a length defined between opposing first and second end 188A, 188B. The first end 188A of the actuation member 188 may protrude from, or be flush with, a bottom surface of the end cap 104, and the second end 188B of the actuation member 188 may protrude into the internal bore 164 of the end cap 104 to engage a switch or button 190 (hereinafter "button" for the sake of convenience without intent to limit) operatively associated with the printed circuit board 162 to selectively control the motor 152 (see FIG. 4). The button 190 may be integrated into the printed circuit board 162, such as into a bottom of the printed circuit board 162, to result in a smaller, tighter, more efficient overall design. The button 190 may be on a centerline of the printed circuit board 162 so the board may be used on a left or a right side of the covering 100. The button 190 may be positioned on the printed circuit board 162 in-line with the channel 182C (see FIGS. 3 and 13) to align the actuation member 188 with the button 190. The longitudinal edges 162A, 162B (see FIG. 12) of the printed circuit board 162 may be supported by the insert 140 (e.g., received in the receiving grooves 144A, 144B of the insert 140) so the printed circuit board 162 does not flex when the button 190 is pressed by the actuation member 188. The insert 140 may include channels 191 (see FIG. 8) extending along a length of the insert 140 to guide cords or wires along the insert 140 and through-passages formed between the resilient arms 130 of the housing 107 and the insert 140. The motor housing 107 may be aligned with the end cap 104 to facilitate the positioning of the printed circuit board 162, the antenna wire 186, the button 190, and the power cord 184 relative to the end cap 104. The splines 120 and the grooves 122 (see FIG. 5) may be configured to facilitate such alignment.

The actuation member 188 may be movable to press the button 190 on the printed circuit board 162, thereby reducing static electricity discharge by isolating the button 190 so that a user does not touch the button 190 directly. The actuation member 188 may be biased to slide within the channel 182C away from the printed circuit board 162 due at least in part to, for example, the weight of the actuation member 188 and/or a bias of the button 190. During operation, a user may press the first end 188A of the actuation member 188 in a first direction 192 to slide the actuation member 188 longitudinally in the first direction 192 within the channel 182C to depress the button 190 and operate the motor assembly 102. The actuation member 188 may be formed as a light pipe to transmit light from a light emitting source, such as a light emitting diode, associated with the printed circuit board 162 to the first end 188A of the actuation member 188 to provide an indication to a user of the status of the motor assembly 102.

Figure 14:
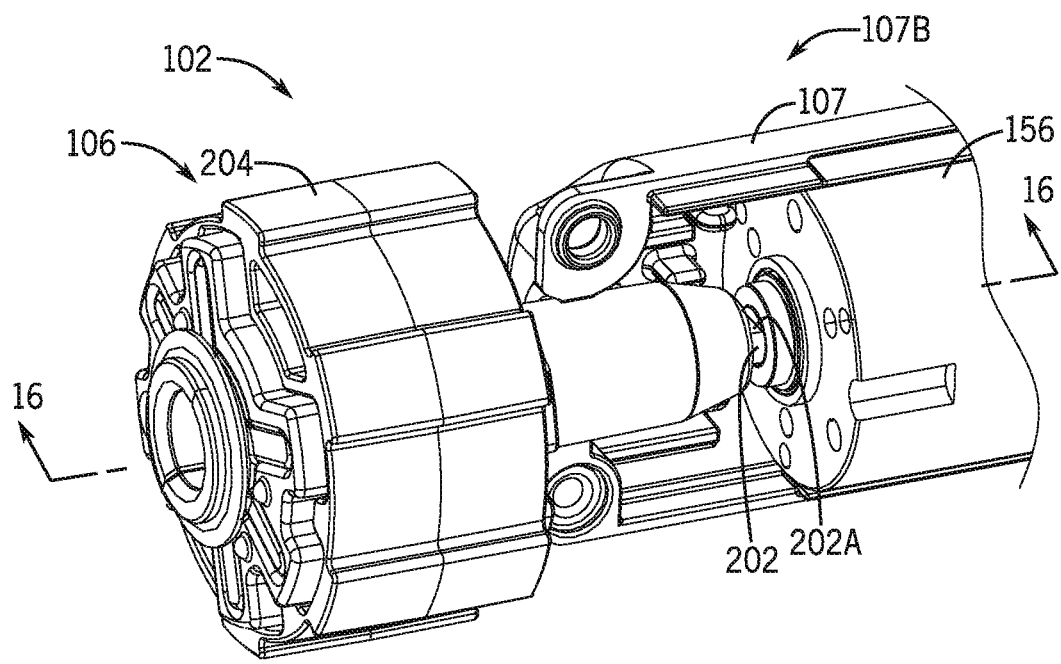
FIG. 14 is an isometric view of a drive structure of the motor assembly of FIG. 1 in accordance with an embodiment of the present disclosure.

Referring to FIG. 14, the drive structure 106 of the motor assembly 102 may be located at the second end 107B of the housing 107. The drive structure 106 may improve torque transfer from a drive or output shaft 202 of the motor assembly 102 to the roller tube 108 (such as the roller tube 108 illustrated in FIG. 1). For example, the drive structure 106 may be configured to eliminate or at least reduce looseness in the connection between the drive structure 106 and the drive shaft 202, such as by providing an engagement between the drive structure 106 and the drive shaft 202 that limits movement of the drive structure 106 relative to the drive shaft 202. For example, the drive structure 106 may be configured to eliminate or reduce looseness in the connection of a drive member or driver 204 (hereinafter "drive member" for the sake of convenience without intent to limit) to the drive shaft 202, thereby improving the positioning accuracy of the motor 152 (see FIG. 4) and/or reducing or eliminating noise in the drive structure 106 while the motor 152 (see FIG. 4) is operated. The drive shaft 202 may be reversibly rotatable by the motor 152 (see FIG. 4) and may project from the distal end of the housing 107, and the drive structure 106 may be operatively connected to the drive shaft 202 and the roller tube 108 to rotate the roller tube 108 (see FIG. 1) and extend or retract a shade attached to the roller tube 108 depending on a rotation direction of the drive shaft 202. The drive shaft 202 may include one or more flats 202A, 202B (see FIG. 16) or other engagement features for facilitating a secure connection of the drive structure 106 to the drive shaft 202. The drive structure 106 may maintain axial alignment of the drive member 204 with the motor 152 (see FIG. 4), such as be limiting axial movement of the drive member 204 away from the motor 152, as explained below. In some embodiments, the drive structure 106 may maintain the drive shaft 202 in concentric alignment with the drive member 204, such as via structure concentrically coupling the drive member 204 to the drive shaft 202, as described in further detail below.

Figure 16:
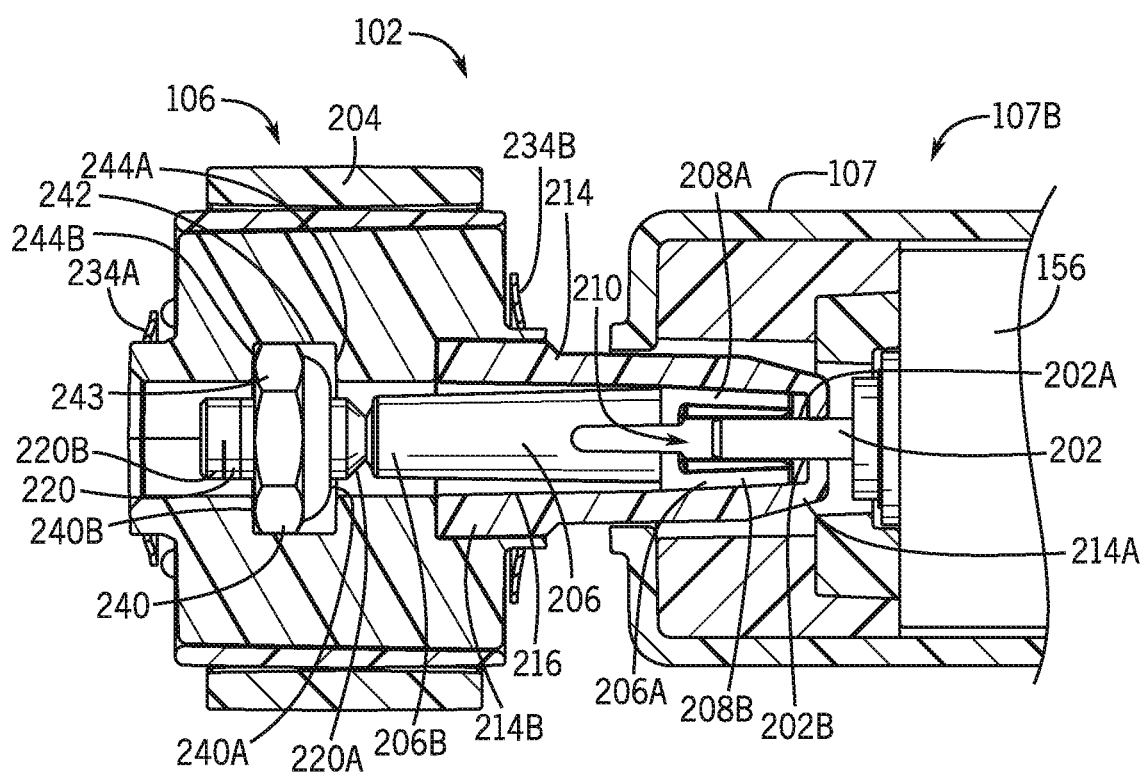
FIG. 16 is a lengthwise cross-section view of the drive structure of FIG. 15 in accordance with an embodiment of the present disclosure.
Figure 15:
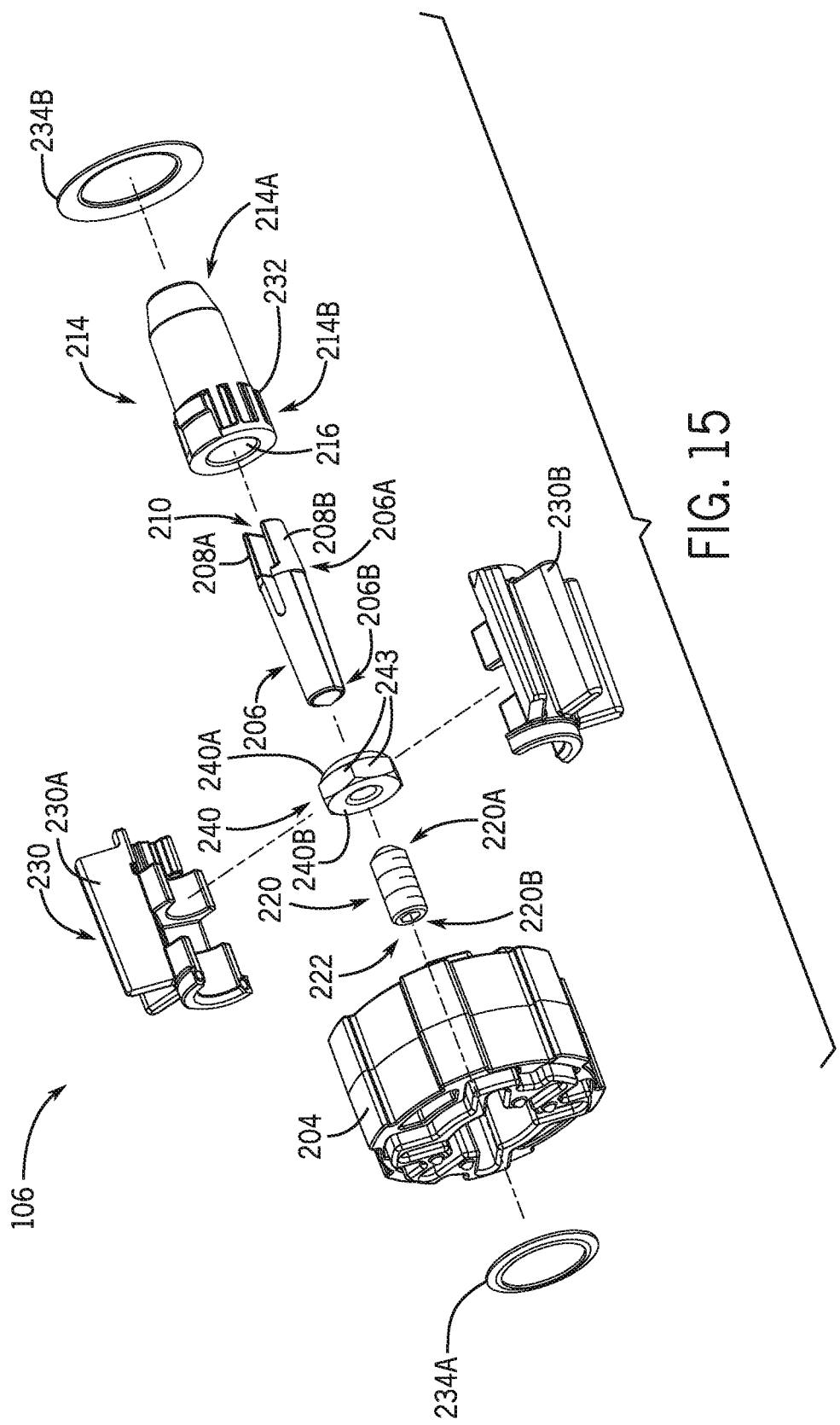
FIG. 15 is an exploded view of the drive structure of FIG. 15 in accordance with an embodiment of the present disclosure.

Referring to FIGS. 15 and 16, the drive structure 106 may include a wedge 206 for engaging the drive shaft 202 (see FIG. 14). The wedge 206 may be axially aligned with a rotation axis of the drive shaft 202 and may include a first end 206A for engaging the drive shaft 202 and a second end 206B spaced a distance from the first end 206A to define a length of the wedge 206. The first end 206A of the wedge 206 may include two or more resilient arms 208A, 208B spaced apart from each other by a gap 210 extending from the first end 206A toward the second end 206B of the wedge 206. In a nominal state, the lateral dimension of the gap 210 defined by the distance between the resilient arms 208A, 208B may be oversized relative to the corresponding thickness of the drive shaft 202 (see FIG. 14). The wedge 206 may taper outwardly from the second end 206B toward the first end 206A such that the outer dimension of the wedge 206 generally increases from the second end 206B to the first end 206A. In some embodiments, the wedge 206 has a conical shape that tapers outwardly from the second end 206B toward the first end 206A.

With continued reference to FIGS. 15 and 16, the drive structure 106 may include a housing 214 for receiving at least the first end 206A of the wedge 206. The housing 214 may be axially aligned with the wedge 206 and may include a first end 214A that may at least partially surround the drive shaft 202 and a second end 214B spaced a distance from the first end 214A to define a length of the housing 214. The housing 214 may include an inner surface 216 defining an inner bore for receiving the wedge 206. The inner surface 216 may taper inwardly from the second end 214B toward the first end 214A of the housing 214 such that the inner dimension of the housing 214 generally decreases from the second end 214B to the first end 214A of the housing 214. In some embodiments, the inner surface 216 has a conical shape that tapers inwardly from the second end 214B toward the first end 214A. To assemble the wedge 206 and the housing 214, the first end 206A of the wedge 206 may be inserted into the second end 214B of the housing 214 and the second end 206B of the wedge 206 may be driven towards the first end 214A of the housing 214. During assembly, the inner surface 216 of the housing 214 may engage the resilient arms 208A, 208B of the wedge 206 and force the resilient arms 208A, 208B inwardly toward each other to clamp onto the drive shaft 202.

The inner surface 216 of the housing 214 and the gap 210 between the resilient arms 208A, 208B may be dimensioned such that the drive shaft 202 is received in the gap 210 and then the inner surface 216 of the housing 214 clamps the resilient arms 208A, 208B onto the drive shaft 202 as the second end 206B of the wedge 206 is driven towards the first end 214A of the housing 214. When the wedge 206 is sufficiently inserted into the housing 214, the annular friction between the wedge 206 and the housing 214 may lock the wedge 206 in place, thus maintaining the clamping force of the resilient arms 208A, 208B on the drive shaft 202 to lock the drive structure 106 to the drive shaft 202. To maintain alignment of the gap 210 of the wedge 206 with the one or more flats 202A, 202B (see FIG. 14) of the drive shaft 202, the wedge 206 and the housing 214 may be keyed to each other such that the wedge 206 is slidable, but not rotatable, relative to the housing 214. For example, the housing 214 may include an interior rib and the wedge 206 may include a mating groove, or the wedge 206 may include an exterior rib and the housing 214 may include a mating groove.

Referring still to FIGS. 15 and 16, the drive structure 106 may include a set screw 220 for facilitating insertion of the wedge 206 into the housing 214 to create a desired clamping force on the drive shaft 202. The set screw 220 may be axially aligned with the wedge 206 and may include a first end 220A and a second end 220B spaced a distance from the first end 220A to define a length of the set screw 220. The first end 220A of the set screw 220 may abut against the second end 206B of the wedge 206 to drive the wedge 206 into the housing 214 and clamp the resilient arms 208A, 208B onto the drive shaft 202. The first end 220A of the set screw 220 and the second end 206B of the wedge 206 may include corresponding alignment features, such as corresponding conical surfaces, for facilitating axial alignment of the set screw 220 and the wedge 206. The second end 220B of the set screw 220 may include an engagement feature 222, such as an internal hexagonal receptacle, for engagement by a tool, such as a hex key, for use by a user to rotate the set screw 220. The set screw 220 may be threadably coupled to the drive member 204 of the drive structure 106 such that rotation of the set screw 220 relative to the drive member 204 moves the set screw 220 in an axial direction. In this manner, a user may rotate the set screw 220 to move the set screw 220 towards or away from the wedge 206 depending on the rotation direction of the set screw 220. It will be appreciated that an axially positioned set screw 220 facilitates maintenance of concentric positioning of the drive shaft 202 and the drive member 204.

With reference to FIG. 15, the drive structure 106 may include a drive hub adapter 230. The drive member 204 may be mounted on the drive hub adapter 230 and may engage the roller tube 108, and thus may be product specific dependent on the particular roller tube used in the covering. The drive hub adapter 230 may provide a common interface to the different drive members, such as the drive member 204, and may at least partially receive the wedge 206, the housing 214, and the set screw 220. The housing 214 may be non-rotatably and non-slidably secured to the drive hub adapter 230. In the illustrative embodiment of FIG. 15, the second end 214B of the housing 214 may include ridges 232 and/or other engagement features for securing the housing 214 to the drive hub adapter 230. As seen in the illustrative embodiment of FIG. 16, the first end 214A of the housing 214 may be cantilevered from the drive hub adapter 230 to extend within the housing 107 of the motor assembly 102 for coupling with the drive shaft 202. With continued reference to FIG. 16, the wedge 206 and the set screw 220 may be movable in an axial direction relative to the drive hub adapter 230.

Referring to FIGS. 15 and 16, the drive structure 106 may include an internally threaded element, such as the illustrated lock nut 240, for threaded engagement with the set screw 220 to facilitate axial movement of the set screw 220. The lock nut 240 may be received within the drive hub adapter 230 and may be restrained from rotating and moving in an axial direction relative to the drive hub adapter 230. To restrict rotational movement of the lock nut 240, the drive hub adapter 230 may include an inner surface 242 that engages one or more flats 243 of the lock nut 240, for example. To restrain axial movement of the lock nut 240, the drive hub adapter 230 may define a pair of opposing shoulders 244A, 244B that confront opposing ends 240A, 240B of the lock nut 240. The set screw 220 may be threaded into the lock nut 240, and rotation of the set screw 220 relative to the lock nut 240 may cause the set screw 220 to move in an axial direction relative to the lock nut 240 to drive the wedge 206 into the housing 214. The lock nut 240 may provide an annular frictional force on the set screw 220 to resist rotation of the set screw 220 relative to the lock nut 240, thus resisting axial movement of the set screw 220 to help maintain the wedge 206 in a desired position within the housing 214 once a desired clamping force on the drive shaft 202 is achieved. In some embodiments, the drive hub adapter 230 may be internally threaded and the set screw 220 may be enlarged relative to the wedge 206 such that the set screw 220 is in direct threaded engagement with the drive hub adapter 230, and thus the lock nut 240 may be omitted in at least these embodiments. The drive hub adapter 230 may include two or more pieces 230A, 230B that may be constrained together around the wedge 206, the housing 214, the set screw 220, and the lock nut 240 with two or more fasteners, such as the illustrated rings 234A, 234B, which may be formed as push nuts.

Referring to FIG. 16, the set screw 220 may be used to adjust the clamping force on the drive shaft 202 of the motor assembly 102. For example, rotation of the set screw 220 in a first direction may move the set screw 220 toward the first end 214A of the housing 214, thereby driving the wedge 206 further into the housing 214 and causing the resilient arms 208A, 208B to move toward each other to increase the clamping force on the drive shaft 202. The set screw 220 may provide a mechanical advantage, and thus a small amount of rotational torque may be applied to the set screw 220 to drive the wedge 206 into the housing 214 and create a locked connection between the drive structure 106 and the drive shaft 202. Rotation of the set screw 220 in a second direction opposite the first direction may move the set screw 220 away from the first end 214A of the housing 214, thereby allowing the wedge 206 to move toward the second end 214B of the housing 214, resulting in the resilient arms 208A, 208B moving away from each other to decrease the clamping force on the drive shaft 202. The drive structure 106 may be released from the drive shaft 202 by backing off the set screw 220 and applying an axial force to the drive structure 106 toward the drive shaft 202 to move the wedge 206 away from the first end 214A of the housing 214, thereby releasing the wedge 206 from the drive shaft 202 and the housing 214. Additionally or alternatively, the resilient arms 208A, 208B may provide a biasing force that moves the wedge 206 toward the second end 214B of the housing 214 and maintains the second end 206B of the wedge 206 in engagement with the first end 220A of the set screw 220.

Figure 17:
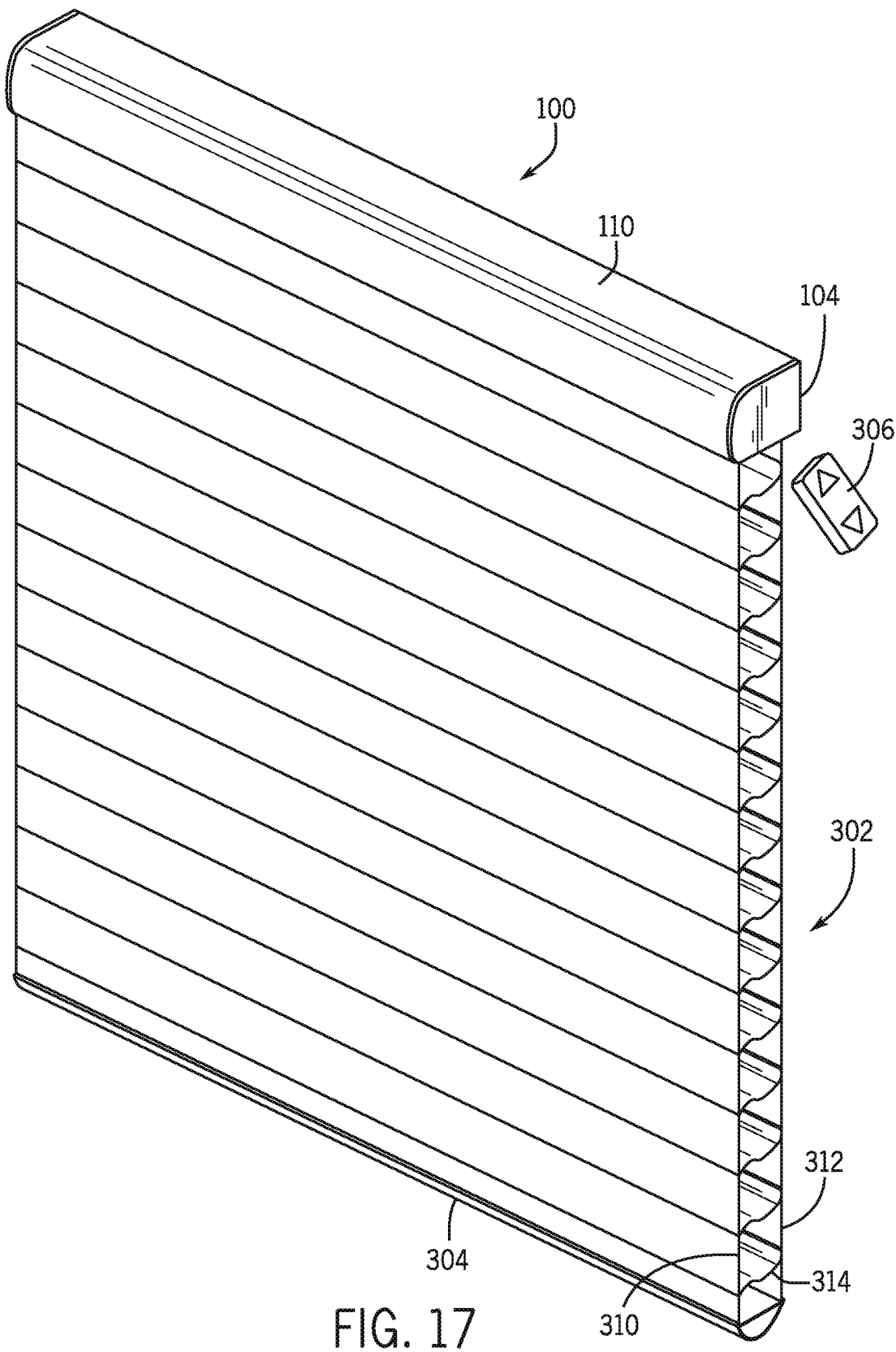
FIG. 17 is an isometric view of the covering of FIG. 1 in an extended position in accordance with an embodiment of the present disclosure.

An illustrative example of the covering 100 including the covering material 302 is shown in FIG. 17. The covering material 302, which may be referred to as a shade, a shade member, or a shade element, may have a width substantially equal to the length of the roller tube 108 (see FIGS. 1 and 11), which may reduce or eliminate the existence of a light gap between the edges of the covering material 302 and the sides of the architectural structure/feature. The covering material 302 may be suspended from the roller tube 108 and may be retracted and extended by rotation of the roller tube 108. For example, to extend the covering material 302, the roller tube 108 may be rotated by the motor assembly 102 in a first rotational direction to unwrap the covering material 302 from the roller tube 108. To retract the covering material 302, the roller tube 108 may be rotated in a second rotational direction opposite the first rotational direction to wrap the covering material 302 about the roller tube 108. In some embodiments, the roller tube 108 may be operable to retract the covering material 302 towards the head rail 110 in a stacked configuration. A bottom rail 304 may extend along a lower edge of the covering material 302 and may function as a ballast to maintain the covering material 302 in a taut condition.

The motor assembly 102 may be configured to extend or retract the covering material 302 upon receiving an extension or retraction command. The motor assembly 102 may be controlled by the actuation member 188 (see FIG. 13). To raise or retract the covering material 302 from an extended position using the actuation member 188, a user may manipulate the actuation member 188 in a first manner (e.g., pressing the actuation member 188 once). To extend or lower the covering material 302 from a retracted position using the actuation member 188, a user may manipulate the actuation component in a second manner (e.g., pressing the actuation member 188 twice or pressing the actuation member 188 for a certain period of time). The motor assembly 102 may be electrically coupled to the switch or button 190 and/or a sensor that is operable to communicate with a transmitter, such as a remote control unit 306. Extension and/or retraction commands may be transmitted to the motor assembly 102 by the remote control unit 306 for controlling the motor 152 to extend and/or retract the covering material 302. The illustrated covering material 302 includes a front sheet 310, a rear sheet 312, and multiple transverse vanes 314 attached to and connecting the front sheet 310 and the rear sheet 312. Other type of covering materials or elements 302 may be used.

The motor assembly 102 and the end cap 104 may be constructed of substantially any type of material. For example, the end cap 104 and the housing 107 may be constructed from natural and/or synthetic materials, including metals, ceramics, plastics, and/or other suitable materials that insulate against static electricity discharge therethrough. Plastic materials may include thermoplastic material (self-reinforced or fiber-reinforced), ABS, polycarbonate, polypropylene, polystyrene, PVC, polyamide, or PTFE, among others. The end cap 104 and the housing 107 may be formed or molded in any suitable manner, such as by plug molding, blow molding, injection molding, or the like.

The foregoing description has broad application. While the provided examples describe an example architectural covering, such as an architectural covering including a covering material extended or retracted via a roller tube, it should be appreciated that the concepts disclosed herein may equally apply to many types of architectural coverings, including Venetian blinds and stackable shades or coverings. While the provided examples depict a motor assembly and a printed circuit board associated with a right end cap, it should be appreciated that the concepts disclosed herein may equally apply to the left end cap. Accordingly, the discussion of any embodiment is meant only to be explanatory and is not intended to suggest that the scope of the disclosure, including the claims, is limited to these examples. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

The phrases "at least one", "one or more", and "and/or", as used herein, are open-ended expressions that are both conjunctive and disjunctive in operation.

The term "a" or "an" entity, as used herein, refers to one or more of that entity. As such, the terms "a" (or "an"), "one or more" and "at least one" can be used interchangeably herein.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, engaged, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

What is claimed is:

1. An architectural covering comprising:
   an end cap having a wall and a boss extending from the wall; and
   a motor assembly including:
      a motor to, when operated, extend or retract a covering; and
      a housing including an end, the motor disposed in the housing, the end of the housing including resilient arms extending into the boss and engaged with an inner surface of the boss to non-rotatably secure the motor assembly to the end cap, wherein a resilient arm of the resilient arms includes a first interface and a second interface that engage the inner surface of the boss, and wherein at least one of the first interface or the second interface provides a snapping engagement of the housing with the end cap.

2. The architectural covering of claim 1, wherein the housing includes splines extending from an outer surface of the end of the housing, and wherein the boss includes grooves formed on the inner surface of the boss, the splines engaged with the grooves to non-rotatably couple the motor assembly to the end cap.

3. The architectural covering of claim 1, wherein the housing includes ribs that extend inward from an inner surface of the housing and into corresponding grooves in the motor.

4. The architectural covering of claim 1, wherein the end cap includes a ledge extending radially inward from the inner surface of the boss, and wherein the resilient arms include respective barbed ends, the barbed ends engaged with the ledge to prevent the motor assembly from being moved axially away from the end cap.

5. The architectural covering of claim 4, wherein the housing includes an annular flange at or near a base of the resilient arms, the annular flange engaged with a distal end of the boss, such that that motor assembly is axially secured to the end cap.

6. The architectural covering of claim 1, further including a roller tube, the motor assembly disposed within the roller tube, the motor assembly including a drive structure engaged with the roller tube, the drive structure to transfer rotational motion from a drive shaft of the motor to the roller tube.

7. The architectural covering of claim 6, further including a bushing disposed around the boss, the roller tube rotatably supported on the bushing.

8. The architectural covering of claim 1, wherein the first interface engages a corresponding first interface on the inner surface of the boss, and wherein the second interface engages a corresponding second interface on the inner surface of the boss.

9. The architectural covering of claim 8, wherein the first interface includes a spline, and wherein the second interface includes a protrusion.

10. The architectural covering of claim 8, wherein the at least one of the first interface or the second interface passes an end of the boss.

11. An architectural covering comprising:
an end cap having a boss defining an internal bore;
a motor assembly including a housing and a motor disposed in the housing, an end of the housing including first resilient arms extending into the internal bore of the boss from a first side of the end cap; and
an insert including second resilient arms extending into the internal bore of the boss from a side of the end cap opposite the first side, the second resilient arms to bias the first resilient arms radially outward and into engagement with an inner surface of the boss.

12. The architectural covering of claim 11, wherein the first resilient arms have first side walls that are angled relative to a radial direction, and wherein the second resilient arms have second side walls that are angled relative to the radial direction and engaged with the first side walls, such that the first and second side walls of the respective first and second resilient arms overlap in the radial direction.

13. The architectural covering of claim 11, wherein the end cap includes a ledge extending radially inward from the inner surface of the boss, and wherein the first resilient arms include respective first barbed ends, the first barbed ends engaged with the ledge.

14. The architectural covering of claim 13, wherein the second resilient arms include respective second barbed ends, the second barbed ends engaged with the ledge.

15. The architectural covering of claim 14, wherein the second barbed ends extend beyond the first barbed ends, such that the ledge is disposed between the first and second barbed ends.

16. The architectural covering of claim 15, wherein the insert includes stop portions between the second resilient arms, the stop portions engaging an opposite side of the ledge than the second barbed ends, such that the insert is axially secured to the end cap.

17. The architectural covering of claim 16, wherein the motor assembly includes a printed circuit board, the printed circuit board extending through longitudinal grooves formed in the stop portions of the insert.

18. An architectural covering comprising:
an end cap including a base wall having a first side and a second side opposite the first side, the end cap including a boss extending from the first side of the base wall, the boss defining an internal bore between a distal end of the boss and the second side of the base wall; and
a motor assembly including:
a housing including an end, the end of the housing including a resilient arm extending into the internal bore of the boss from the distal end of the boss, wherein the resilient arm includes a first interface and a second interface that engage the internal bore, and wherein at least one of the first interface or the second interface provides a snapping engagement of the housing with the end cap;
a motor disposed in the housing; and
a printed circuit board partially disposed in the housing, the printed circuit board extending from the end of the housing and into the internal bore such that such that the printed circuit board is accessible from the second side of the base wall.

19. The architectural covering of claim 18, wherein an edge of the printed circuit board is aligned with the second side of the base wall of the end cap.

20. The architectural covering of claim 18, wherein the base wall includes a recess formed in the second side, further including a power cord disposed in the recess and coupled to the printed circuit board.

* * * * *